(12) United States Patent
Nakagata

(10) Patent No.: US 10,453,206 B2
(45) Date of Patent: Oct. 22, 2019

(54) METHOD, APPARATUS FOR SHAPE ESTIMATION, AND NON-TRANSITORY COMPUTER-READABLE STORAGE MEDIUM

(71) Applicant: FUJITSU LIMITED, Kawasaki-shi, Kanagawa (JP)

(72) Inventor: Shohei Nakagata, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 98 days.

(21) Appl. No.: 15/683,318

(22) Filed: Aug. 22, 2017

(65) Prior Publication Data

US 2018/0082434 A1    Mar. 22, 2018

(30) Foreign Application Priority Data

Sep. 20, 2016 (JP) .................................. 2016-183497

(51) Int. Cl.
*G06T 7/579* (2017.01)
*G06T 7/136* (2017.01)
(Continued)

(52) U.S. Cl.
CPC .......... *G06T 7/579* (2017.01); *G06K 9/00201* (2013.01); *G06K 9/00375* (2013.01);
(Continued)

(58) Field of Classification Search
None
See application file for complete search history.

(56) References Cited

U.S. PATENT DOCUMENTS

| 6,859,549 B1* | 2/2005 | Oliensis ................. G06K 9/209 |
| | | 382/154 |
| 6,999,612 B1* | 2/2006 | Oliensis ................. G06T 7/579 |
| | | 382/154 |

(Continued)

FOREIGN PATENT DOCUMENTS

| JP | 2000-194859 | 7/2000 |
| JP | 2002-32745 | 1/2002 |

(Continued)

OTHER PUBLICATIONS

H. Zhou and T. Zhang, "Outliers handling in the structure-from-motion algorithm," 2014 4th IEEE International Conference on Information Science and Technology, Shenzhen, 2014, pp. 164-167 (Year: 2014).*

(Continued)

*Primary Examiner* — Andrae S Allison
(74) *Attorney, Agent, or Firm* — Staas & Halsey LLP

(57) ABSTRACT

A method for shape estimation includes: executing extraction processing that includes extracting a plurality of feature points from a plurality of pieces of image information of a same subject photographed with a time difference; executing estimation processing that includes first processing for selecting feature points from the plurality of feature points; second processing for estimating a three-dimensional shape of the subject based on the selected feature points; third processing for removing the feature points from the plurality of feature points after the estimation of the three-dimensional shape based on the feature points; and fourth processing for executing the first processing, the second processing, and the third processing on the plurality of feature points from which the feature points are removed by the third processing; and executing integration processing that (Continued)

includes integrating a plurality of the three-dimensional shapes estimated by the estimating processing.

6 Claims, 32 Drawing Sheets

(51) Int. Cl.
 *G06T 7/11* (2017.01)
 *G06T 7/174* (2017.01)
 *G06K 9/46* (2006.01)
 *G06K 9/00* (2006.01)
 *G06K 9/62* (2006.01)

(52) U.S. Cl.
 CPC .......... *G06K 9/4676* (2013.01); *G06K 9/6211* (2013.01); *G06T 7/11* (2017.01); *G06T 7/136* (2017.01); *G06T 7/174* (2017.01); *G06T 2207/10016* (2013.01); *G06T 2207/10028* (2013.01)

(56) References Cited

U.S. PATENT DOCUMENTS

| | | | |
|---|---|---|---|
| 9,466,143 B1* | 10/2016 | Walvoord | G06T 15/00 |
| 2008/0310757 A1* | 12/2008 | Wolberg | G06K 9/00208 |
| | | | 382/285 |
| 2010/0158482 A1* | 6/2010 | Sikora | G06T 15/205 |
| | | | 386/241 |
| 2012/0041722 A1* | 2/2012 | Quan | G06T 17/05 |
| | | | 703/1 |
| 2012/0106840 A1* | 5/2012 | Singhal | H04N 9/045 |
| | | | 382/167 |
| 2014/0119604 A1* | 5/2014 | Mai | G06K 9/00624 |
| | | | 382/103 |
| 2014/0147032 A1* | 5/2014 | Yous | G06T 7/246 |
| | | | 382/154 |
| 2015/0063684 A1* | 3/2015 | Taylor | G06T 7/536 |
| | | | 382/154 |
| 2017/0324941 A1* | 11/2017 | Birkler | H04N 5/23296 |

FOREIGN PATENT DOCUMENTS

| | | |
|---|---|---|
| JP | 2012-208759 | 10/2012 |
| JP | 2014-63376 | 4/2014 |

OTHER PUBLICATIONS

Davide Scaramuzza, 1-Point-RANSAC Structure from Motion for Vehicle-Mounted Cameras by Exploiting Non-holonomic Constraints, Int J Comput Vis (2011) 95:74-85 (Year: 2011).*

* cited by examiner

FIG. 16
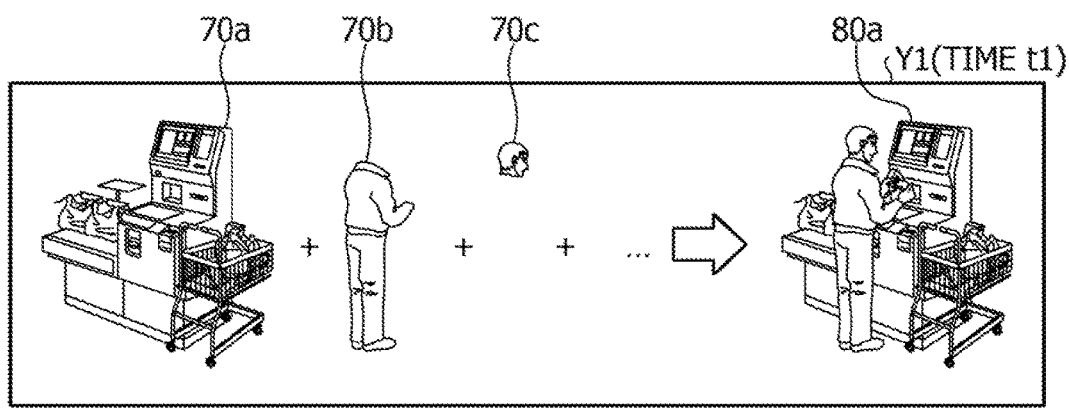
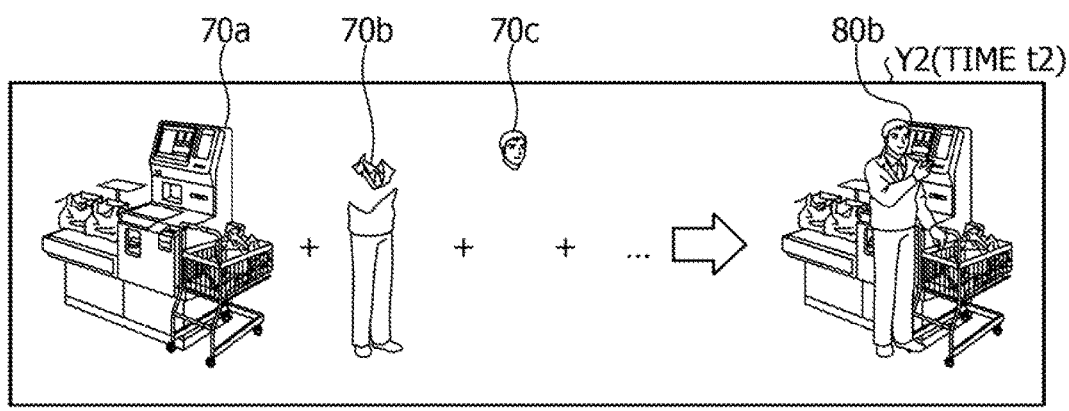

FIG. 19

| PHOTOGRAPHING TIME | IMAGE INFORMATION | FEATURE POINT INFORMATION |
|---|---|---|
| TIME t1 | IMAGE INFORMATION PHOTOGRAPHED AT TIME t1 | INFORMATION ON FEATURE POINTS OF IMAGE INFORMATION PHOTOGRAPHED AT TIME t1 |
| TIME t2 | IMAGE INFORMATION PHOTOGRAPHED AT TIME t2 | INFORMATION ON FEATURE POINTS OF IMAGE INFORMATION PHOTOGRAPHED AT TIME t2 |
| TIME t3 | IMAGE INFORMATION PHOTOGRAPHED AT TIME t3 | INFORMATION ON FEATURE POINTS OF IMAGE INFORMATION PHOTOGRAPHED AT TIME t3 |
| ... | ... | ... |

FIG. 20

| IDENTIFICATION INFORMATION | THREE-DIMENSIONAL SHAPE | PARAMETER |
|---|---|---|
| THREE-DIMENSIONAL SHAPE 70a | THREE-DIMENSIONAL COORDINATES ($q_1$ TO $q_i$) OF MAP POINTS OF THREE-DIMENSIONAL SHAPE 70a | PARAMETERS $p_1$ TO $p_i$ USED TO ESTIMATE THREE-DIMENSIONAL SHAPE 70a |
| THREE-DIMENSIONAL SHAPE 70b | THREE-DIMENSIONAL COORDINATES ($q_1$ TO $q_i$) OF MAP POINTS OF THREE-DIMENSIONAL SHAPE 70b | PARAMETERS $p_1$ TO $p_i$ USED TO ESTIMATE THREE-DIMENSIONAL SHAPE 70b |
| THREE-DIMENSIONAL SHAPE 70c | THREE-DIMENSIONAL COORDINATES ($q_1$ TO $q_i$) OF MAP POINTS OF THREE-DIMENSIONAL SHAPE 70c | PARAMETERS $p_1$ TO $p_i$ USED TO ESTIMATE THREE-DIMENSIONAL SHAPE 70c |
| ... | ... | ... |

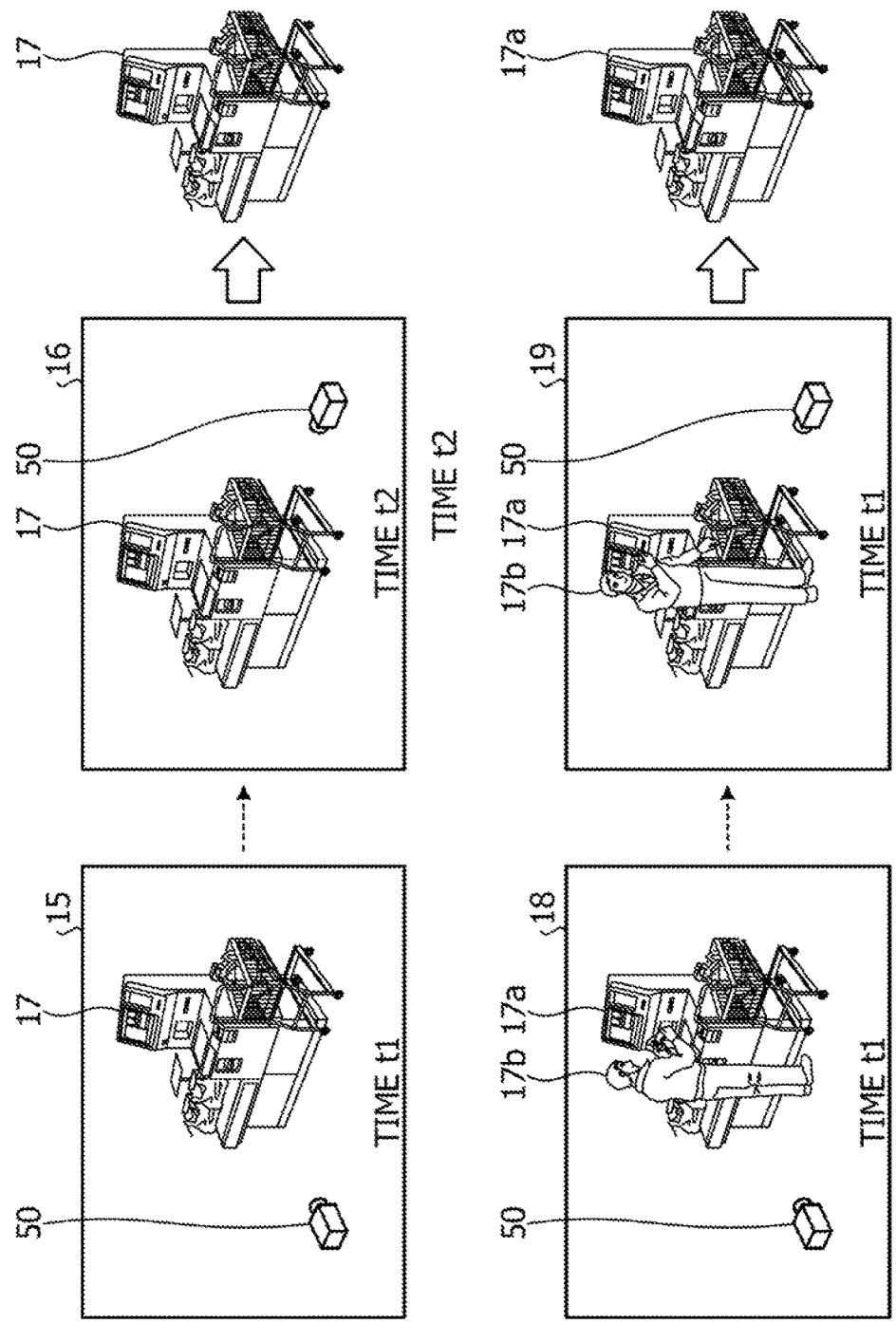

METHOD, APPARATUS FOR SHAPE ESTIMATION, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-183497, filed on Sep. 20, 2016, the entire contents of which are incorporated herein by reference.

FIELD

The embodiment discussed herein is related to a method, an apparatus for shape estimation, and a non-transitory computer-readable storage medium.

BACKGROUND

There is a technique for reconstructing a three-dimensional shape of a subject based on image information of the subject photographed by a camera from multiple points of view. For example, the three-dimensional shape of the subject is information in which multiple feature points forming the subject on a three dimension and three-dimensional coordinates are associated.

A conventional technique called structure from motion (SfM) is used to reconstruct the three-dimensional shape from multiple pieces of image information photographed by one camera with a point of view changed FIGS. 29 and 30 are diagrams for explaining the SfM. The SfM executes a procedure 1 and a procedure 2 in order.

The procedure 1 is explained with reference to FIG. 29. The SfM extracts feature points from pieces of image information and matches the feature points most coinciding with one another in the pieces of image information. Pieces of image information 10, 11, and 12 illustrated in FIG. 29 are pieces of image information photographed in different photographing directions and at different timings by one camera. The same subject is included in the pieces of image information 10, 11, and 12.

The SfM calculates feature points of each of the pieces of image information 10 to 12 based on scale-invariant feature transform (SIFT) feature values. In FIG. 29, as an example, feature points $10a$, $10b$, and $10c$ are calculated from the image information 10, feature points $11a$, $11b$, and $11c$ are calculated from the image information 11, and feature points $12a$, $12b$, and $12c$ are calculated from the image information 12. The SfM matches the feature points $10a$ to $10c$, $11a$ to $11c$, and $12a$ to $12c$, respectively. For example, the SfM associates the feature points $10a$, $11a$, and $12a$ with each other. The SfM associates the feature points $10b$, $11b$, and $12b$ with each other. The SfM associates the feature points $10c$, $11c$, and $12c$ with each other.

The procedure 2 is explained with reference to FIG. 30. In the following explanation, a feature point of a subject on a three dimension is referred to as "map point". A point obtained by projecting the map point on image information based on camera parameters is referred to as "projection point" as appropriate. Projection points $20a$ to $20c$ are points obtained by projecting map points $30a$ to $30c$ on the image information 10. Projection points $21a$ to $21c$ are points obtained by projecting the map points $30a$ to $30c$ on the image information 11. Projection points $22a$ to $22c$ are points obtained by projecting the map points $30a$ to $30c$ on the image information 12.

The SfM associates the feature points and the projection points in each of the pieces of image information and executes a search while changing values of three-dimensional coordinates and camera parameters of the map points such that a square sum of differences between the associated feature points and projection points is minimized. In an example illustrated in FIG. 30, the feature points $10a$ to $10c$ are respectively associated with the projection points $20a$ to $20c$. The feature points $11a$ to $11c$ are respectively associated with the projection points $22a$ to $22c$. The feature points $12a$ to $12c$ are respectively associated with the projection points $22a$ to $22c$. The three-dimensional coordinates of the map points $30a$ to $30c$ where a square sum of differences between the associated feature points and projection points is minimized represent a reconstructed three-dimensional shape of the subject.

In the SfM, if noise is included in image information, the three-dimensional coordinates and camera parameters of map points deviating from the optimum values are sometimes estimated because of the noise.

FIG. 31 is a diagram for explaining the influence of noise. In an example illustrated in FIG. 31, a map point $30d$ occurs as noise. Therefore, in addition to the associating explained with reference to FIG. 30, the associating of a feature point $10d$ and a projection point $20d$, the associating of a feature point $11d$ and a projection point $21d$, and the associating of a feature point $12d$ and a projection point $22d$ are performed. In the SfM, values of the three-dimensional coordinates and the camera parameters of the map points are searched out such that the square sum of the differences between the associated feature points and projection points is minimized. Therefore, the search is affected by the noise. In order to solve this problem, the SfM has been executed after removing the noise using a technique called random sample consensus (RANSAC).

Examples of the related art include Japanese Laid-open Patent Publication Nos. 2000-194859, 2002-032745, 2012-208759, and 2014-063376.

SUMMARY

According to an aspect of the invention, a method for shape estimation includes: executing extraction processing that includes extracting a plurality of feature points from a plurality of pieces of image information of a same subject photographed with a time difference; executing estimation processing that includes first processing for selecting feature points from the plurality of feature points; second processing for estimating a three-dimensional shape of the subject based on the selected feature points; third processing for removing the feature points from the plurality of feature points after the estimation of the three-dimensional shape based on the feature points; and fourth processing for executing the first processing, the second processing, and the third processing on the plurality of feature points from which the feature points are removed by the third processing; and executing integration processing that includes integrating a plurality of the three-dimensional shapes estimated by the estimating processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a diagram (5) for explaining processing by the shape estimating apparatus according to the embodiment;

FIG. 19 is a diagram illustrating an example of a data structure of an image table;

FIG. 20 is a diagram illustrating an example of a data structure of a three-dimensional shape table;

FIG. 32 is a diagram for explaining a problem of related art.

DESCRIPTION OF EMBODIMENTS

In the related art, when the subject is a moving body, it is difficult to estimate a three-dimensional shape of the subject from multiple pieces of image information photographed by one camera.

Figure 31:
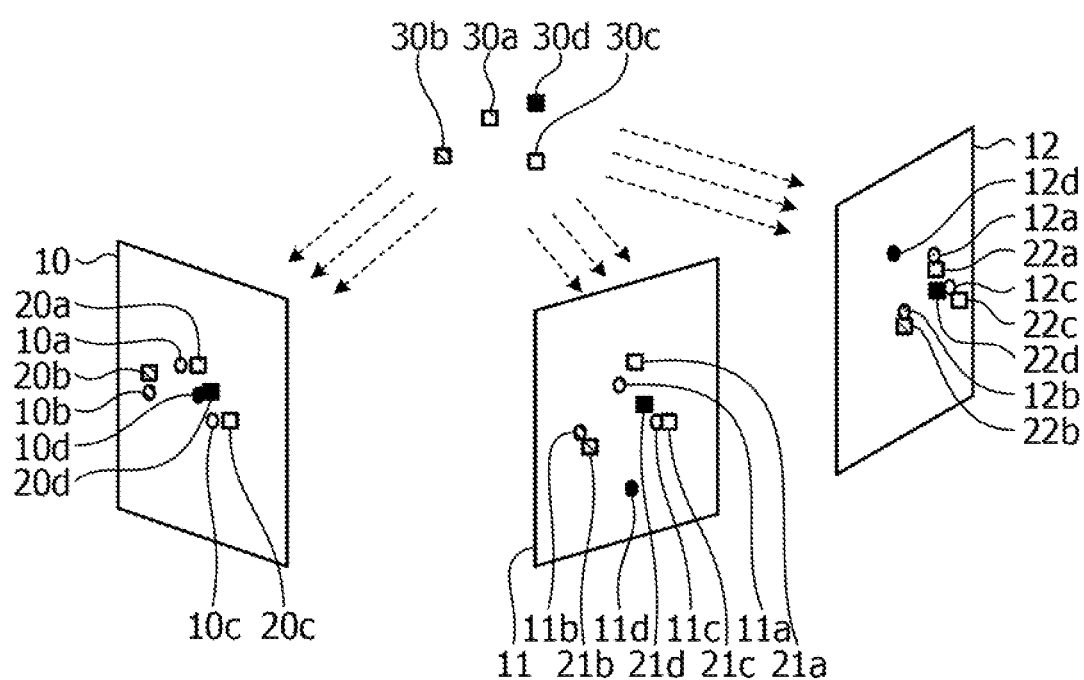
FIG. 31 is a diagram for explaining the influence of noise.

The SfM is a technique based on the premise that the subject stands still. Therefore, if the subject moves, the subject may be determined as noise and removed by the RANSAC. As a result, in the SfM in the related art, it is difficult to estimate a three-dimensional shape of a subject which does not stand still. On the other hand, without performing noise removal by the RANSAC as explained with reference to FIG. 31, estimation accuracy of a three-dimensional shape of a subject is deteriorated because the processing is performed in a state including a noise component.

FIG. 32 is a diagram for explaining a problem of the related art. Image information 15 illustrated in FIG. 32 is image information photographed by a camera 50 at time t1. Image information 16 is image information photographed by the camera 50 at time t2. Note that the position of the camera 50 at time t1 and the position of the camera 50 at time t2 are different. A subject 17 is present in the image information 15 and 16. The subject 17 stands still. Therefore, it is possible to estimate a three-dimensional shape of the subject 17 with the SfM in the related art.

Image information 18 is image information photographed by the camera 50 at time t1. Image information 19 is image information photographed by the camera 50 at time t2. Note that the position of the camera 50 at time t1 and the position of the camera 50 at time t2 are different. A subject 17a and a subject 17b are present in the image information 18 and 19. The subject 17a stands still and the subject 17b is moving. In this case, feature points of the subject 17b are regarded as noise and are removed during corresponding point fitting. Therefore, it is possible to estimate only a three-dimensional shape of the subject 17a out of the subjects 17a and 17b.

Note that, when the subject is a moving body, it is possible to estimate a three-dimensional shape using multiple pieces of image information photographed by multiple cameras that synchronize with one another. However, control is complicated and development cost increases.

In one aspect, an object of the present disclosure is to provide a technique for shape estimation that may estimate a three-dimensional shape of a subject from multiple pieces of image information photographed by one camera.

An embodiment of a shape estimating method, a shape estimating apparatus, and a shape estimating program disclosed by this application is explained in detail below with reference to the drawings. Note that the present disclosure is not limited by the embodiment.

Before the explanation of this embodiment, camera parameters are explained and the SfM and the RANSAC are explained in detail.

The camera parameters are explained. The camera parameters include external parameters and internal parameters.

The external parameters include a translation vector T representing the position of a camera and a rotation matrix R representing the direction of the camera. The translation vector T is indicated by Expression (1) and the rotation matrix R is indicated by Expression (2).

$$T = \begin{pmatrix} t_x \\ t_y \\ t_z \end{pmatrix} \quad (1)$$

$$R = \begin{pmatrix} r_{11} & r_{12} & r_{13} \\ r_{21} & r_{22} & r_{23} \\ r_{31} & r_{32} & r_{33} \end{pmatrix} \quad (2)$$

The internal parameters include a camera matrix A representing a focal length and the like of the camera and a distortion parameter representing distortion of a lens. The camera matrix A is indicated by Expression (3). In Expression (3), fx and fy indicate focal lengths and cx and cy indicate principal points (center coordinates) of image information photographed by the camera. The distortion parameter is indicated by n components.

$$A = \begin{pmatrix} f_x & 0 & c_x \\ 0 & f_y & c_y \\ 0 & 0 & 1 \end{pmatrix} \quad (3)$$

Figure 1:
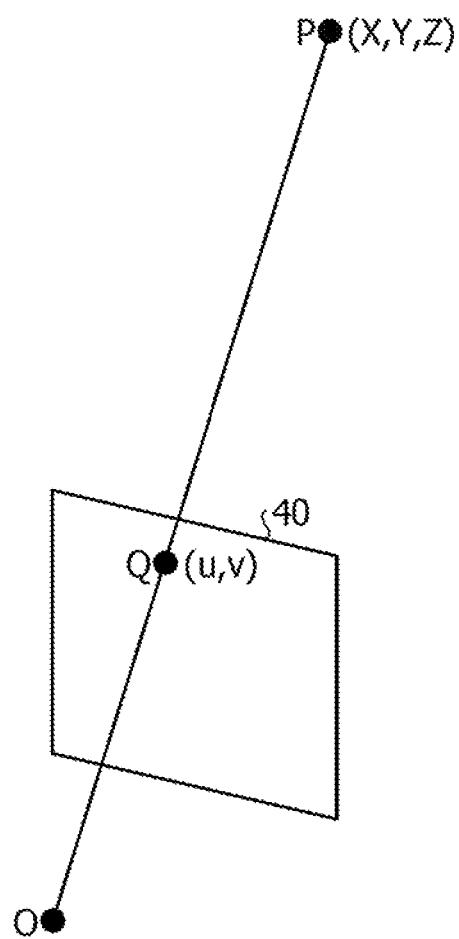
FIG. 1 is a diagram (1) for explaining conversion of a coordinate system.

Conversion of a coordinate system performed using the camera parameters is explained. FIG. 1 is a diagram (1) for explaining the conversion of the coordinate system. In FIG. 1, a point P indicates a certain point on a three-dimensional space. The coordinates of the point P are represented as (X, Y, Z). A point 0 indicates a camera position (an optical center). A relational expression that holds between the coordinates of the point P and a position Q(u, v) at the time when the point P is projected on an image plane 40 of the camera is Expression (4). In Expression (4), "s" satisfies a condition indicated by Expression (5) and is defined by Expression (6).

$$s \begin{pmatrix} u \\ v \\ 1 \end{pmatrix} = A \left[ R \begin{pmatrix} X \\ Y \\ Z \end{pmatrix} + T \right] \quad (4)$$

$$OQ:OP = 1:s \quad (5)$$

$$s = \frac{OP}{OQ} \quad (6)$$

Figure 2:
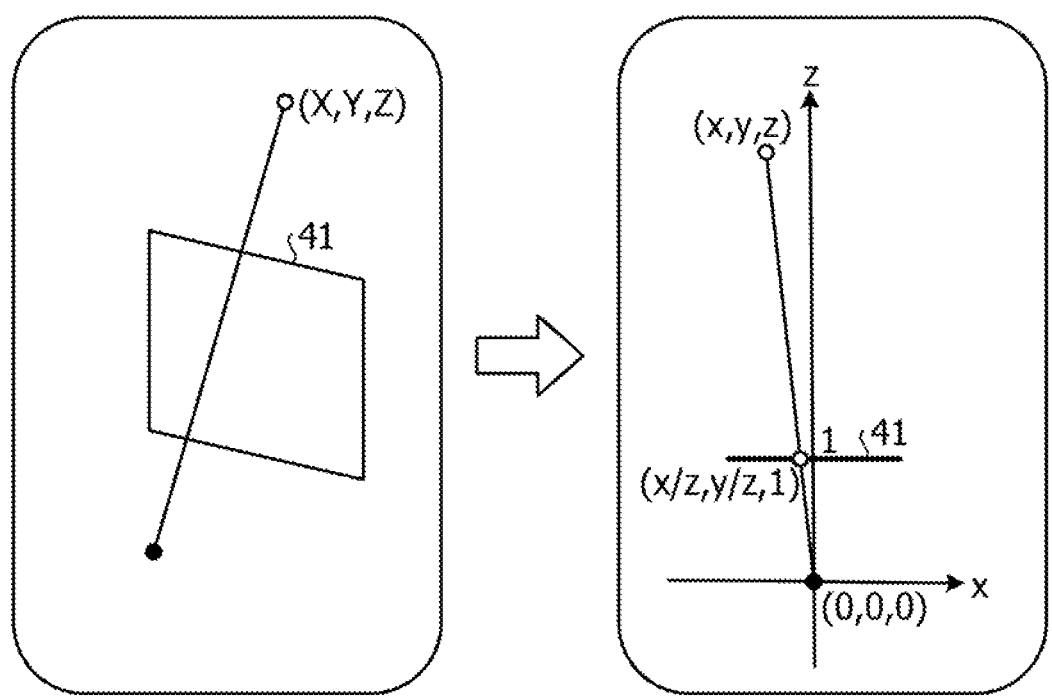
FIG. 2 is a diagram (2) for explaining the conversion of the coordinate system.

Subsequently, the three-dimensional coordinate system is converted to satisfy a condition A1 and a condition A2 described below. FIG. 2 is a diagram (2) for explaining the conversion of the coordinate system.

Condition A1: The position of the camera is the origin (0, 0, 0).

Condition A2: The direction of the camera is a positive direction of a z axis and a projection surface 41 is on z=1.

A conversion formula for converting the three-dimensional coordinate system to satisfy the condition A1 and the condition A2 is Expression (7). When coordinates converted by Expression (7) are projected on the projection surface 41 on z=1, converted coordinates are (x/z, y/z, 1). In the following explanation, the coordinates (x/z, y/z, 1) are replaced as indicated by Expression (8).

$$\begin{pmatrix} x \\ y \\ z \end{pmatrix} = R \begin{pmatrix} X \\ Y \\ Z \end{pmatrix} + T \quad (7)$$

$$\begin{pmatrix} x/z \\ y/z \\ 1 \end{pmatrix} \Rightarrow \begin{pmatrix} x' \\ y' \\ 1 \end{pmatrix} \quad (8)$$

Figure 3:
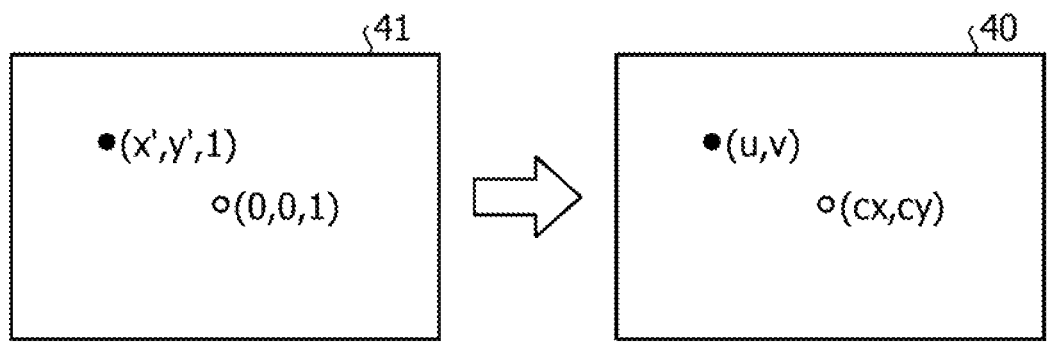
FIG. 3 is a diagram (3) for explaining the conversion of the coordinate system.

A conversion formula for converting the coordinates (x, y) of the projection surface 41 into coordinates of an image plane 40 of the camera is Expression (9). FIG. 3 is a diagram (3) for explaining the conversion of the coordinate system. Expression (10) is obtained by substituting Expression (3) in Expression (9).

$$\begin{pmatrix} u \\ v \\ 1 \end{pmatrix} = A \begin{pmatrix} x' \\ y' \\ 1 \end{pmatrix} \quad (9)$$

$$\begin{pmatrix} u \\ v \end{pmatrix} = \begin{pmatrix} f_x x' + c_x \\ f_y y' + c_y \end{pmatrix} \quad (10)$$

In view of the above explanation, a relation between the coordinates (X, Y, Z) of the point P on the three-dimensional coordinates illustrated in FIG. 1 and the point Q(u, v) on the image plane 40 of the camera may be represented by Expression (11). When Expression (11) is transformed by setting z=1, Expression (12) holds.

$$\begin{pmatrix} u \\ v \\ 1 \end{pmatrix} = A \begin{pmatrix} x' \\ y' \\ 1 \end{pmatrix} = \frac{1}{z} A \begin{pmatrix} x \\ y \\ z \end{pmatrix} = \frac{1}{z} A \left[ R \begin{pmatrix} X \\ Y \\ Z \end{pmatrix} + T \right] \quad (11)$$

$$s \begin{pmatrix} u \\ v \\ 1 \end{pmatrix} = A \left[ R \begin{pmatrix} X \\ Y \\ Z \end{pmatrix} + T \right] \quad (12)$$

Figure 4:
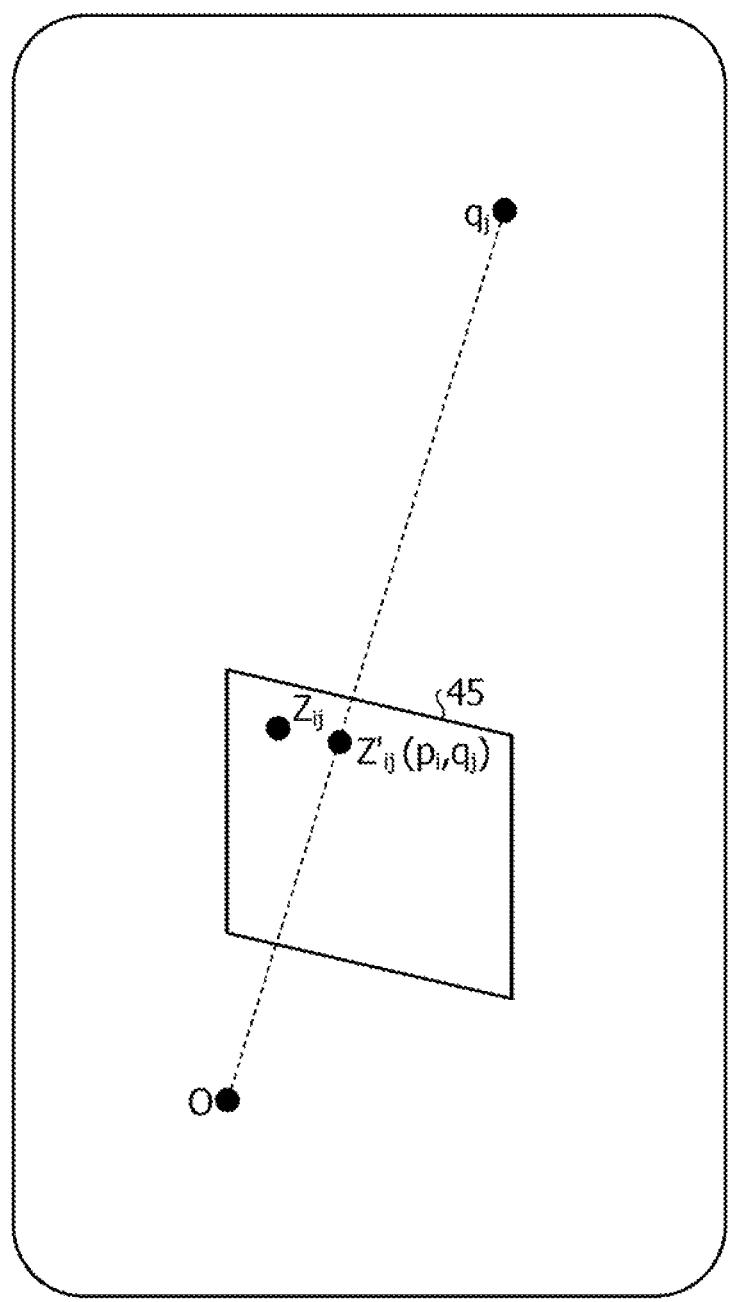
FIG. 4 is a diagram for supplementing explanation of SfM.

The SfM is explained in detail. FIG. 4 is a diagram for supplementing the explanation of the SfM. Note that variables are defined as described below.

n: The number of feature points (map points) on a three-dimensional space qj: Three-dimensional coordinates (estimation target) of a j-th feature point (map point) 1≤j≤n m: The number of pieces of image information zij: Two-dimensional coordinates (known) of the j-th feature point in i-th image information 45 1≤i≤m Ai: A 3×3 camera matrix (an estimation target) of a camera that photographs the i-th image information 45

Ri: A 3×3 translation rotation matrix (an estimation target) of the camera that photographs the i-th image information 45

Ti: A 3×1 translation component (an estimation target) of the camera that photographs the i-th image information 45 pi: arrangement of unknown parameters of Ai, Ri, and Ti

The two-dimensional coordinates of a projection point obtained by projecting a map point on the image information 45 are defined by Expression (13). In Expression (13), z'ij(pi, qj) may be represented by Expression (14).

$$z'_{ij}(p_i, q_j) = \begin{pmatrix} u'_{ij}(p_i, q_j) \\ v'_{ij}(p_i, q_j) \end{pmatrix} \quad (13)$$

$$s \begin{pmatrix} u'_{ij}(p_i, q_j) \\ v'_{ij}(p_i, q_j) \\ 1 \end{pmatrix} = A_i(R_i q_j + T) \quad (14)$$

A re-projection error is defined. A square error between the two-dimensional coordinates zij of the feature point of the image information 45 and the projection point z'ij(pi, qj) is defined by Expression (15).

$$[z_{ij} - z'_{ij}(p_i, q_j)]^2 \quad (15)$$

An error obtained by adding up the square error defined by Expression (15) in all pieces of image information i and all map points j is defined as "re-projection error". The re-projection error is represented by Expression (16).

$$E(p_1, \ldots, p_m, q_1, \ldots, q_n) = \frac{1}{2} \sum_{i=1}^{m} \sum_{j=1}^{n} [z_{ij} - z'_{ij}(p_i, q_j)]^2 \quad (16)$$

The SfM iterates calculation of the re-projection error defined by Expression (16) while changing a value of the camera parameter pi and calculates values of the three-dimensional coordinates qi and the camera parameter pi with which the re-projection error is minimized. The calculated three-dimensional coordinates qi are a three-dimensional shape of the subject.

The RANSAC is explained in detail. The RANSAC executes a procedure (a), a procedure (b), a procedure (c), a procedure (d), and a procedure (e) in order as explained below.

The procedure (a) is explained. The RANSAC selects, at random, k feature points out of n feature points included in the image information 45. Note that variables are defined as described below.

K: A set of feature point indexes selected from the image information 45

A known condition is as described below.

zij: Two-dimensional coordinates of a j-th (j∈K) feature point in i-th (1≤i≤m) image information.

Estimation targets are as described below.

qj: Three-dimensional coordinates (j∈K) of the j-th feature point (map point)

pi: A camera parameter (1≤i≤m)

The procedure (b) is explained. The RANSAC calculates a parameters pi, qj for minimizing Expression (17).

$$E(p_1, \ldots, p_m, \{q_j \mid j \in K\}) = \frac{1}{2} \sum_{i=1}^{m} \sum_{j \in K} [z_{ij} - z'_{ij}(p_i, q_j)]^2 \quad (17)$$

The procedure (c) is explained. After calculating the parameter pi, qj, the RANSAC checks the distance between zij and z'ij(pi, qi) for all zij and calculates an evaluation function indicating how close the distance is. In the following explanation, a calculation expression of the evaluation function is explained.

The evaluation function is represented as F(x). However, x of the evaluation function F(x) is defined by Expression (18). A local evaluation value f indicated by Expression (19) is defined. A threshold th is a value set in advance. Note that the local evaluation value f may be a normal distribution indicated by Expression (20). σ is a value set in advance.

$$x = (p_1, \ldots, p_m, q_1, \ldots, q_n) \quad (18)$$

$$f(p_i, q_j) = \begin{cases} 1 & \text{if } ([z_{ij} - z'_{ij}(p_i, q_j)]^2 \leq th) \\ 0 & \text{otherwise} \end{cases} \quad (19)$$

$$f(p_i, q_j) = \frac{1}{\sqrt{2\pi\sigma^2}} \exp\left(-\frac{[z_{ij} - z'_{ij}(p_i, q_j)]^2}{2\sigma^2}\right) \quad (20)$$

The RANSAC calculates an evaluation function F(x) according to Expression (21).

$$F(x) = \sum_{i=1}^{m} \sum_{j=1}^{n} f(p_i, q_j) \quad (21)$$

The procedure (d) is explained. The RANSAC registers a value of the evaluation function F(x) calculated in the procedure (c) and a parameter x respectively in variables F* and x*.

The procedure (e) is explained. The RANSAC iterates the calculations of the procedure (a) to the procedure (c) and, when F(x)>F* in the respective repetitions, updates F* and x* in processing of the procedure (d).

The variable x* calculated by the procedure (a) to the procedure (e) is as indicated by Expression (22).

$$x^* = (p_1^*, \ldots, p_m^*, q_1^*, \ldots, q_n^*) \quad (22)$$

A set Q defined by Expression (23) among three-dimensional positions q1*, ..., and qn* in Expression (22) above is set as feature points (map points), which are not noise, to reconstruct a three-dimensional shape. A condition described on the right side of Expression (23) may be, for example, a condition such as "a ratio of the re-projection error equal to or lower than a threshold th2 in an i-th image information is 80 percent or more".

$$Q = \left\{ q_j^* \,\middle|\, \sum_{i=1}^{m} [z_{ij} - z'_{ij}(p_i^*, q_j^*)]^2 \leq th2 \right\} \quad (23)$$

Figure 5:
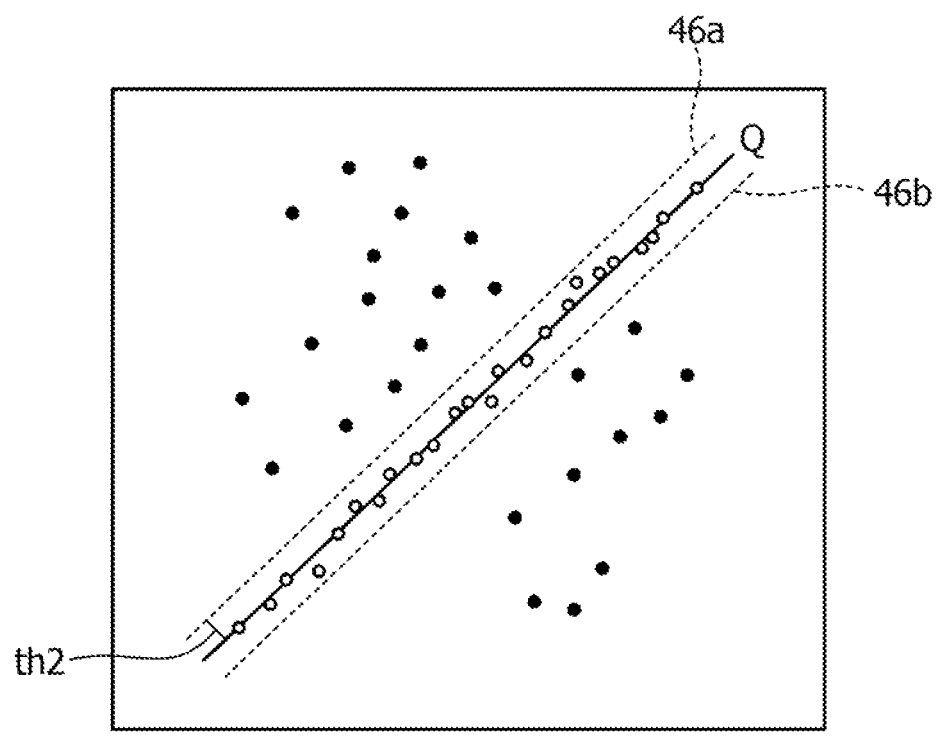
FIG. 5 is a diagram illustrating an example of a set Q reconstructed by RANSAC.
Figure 6:
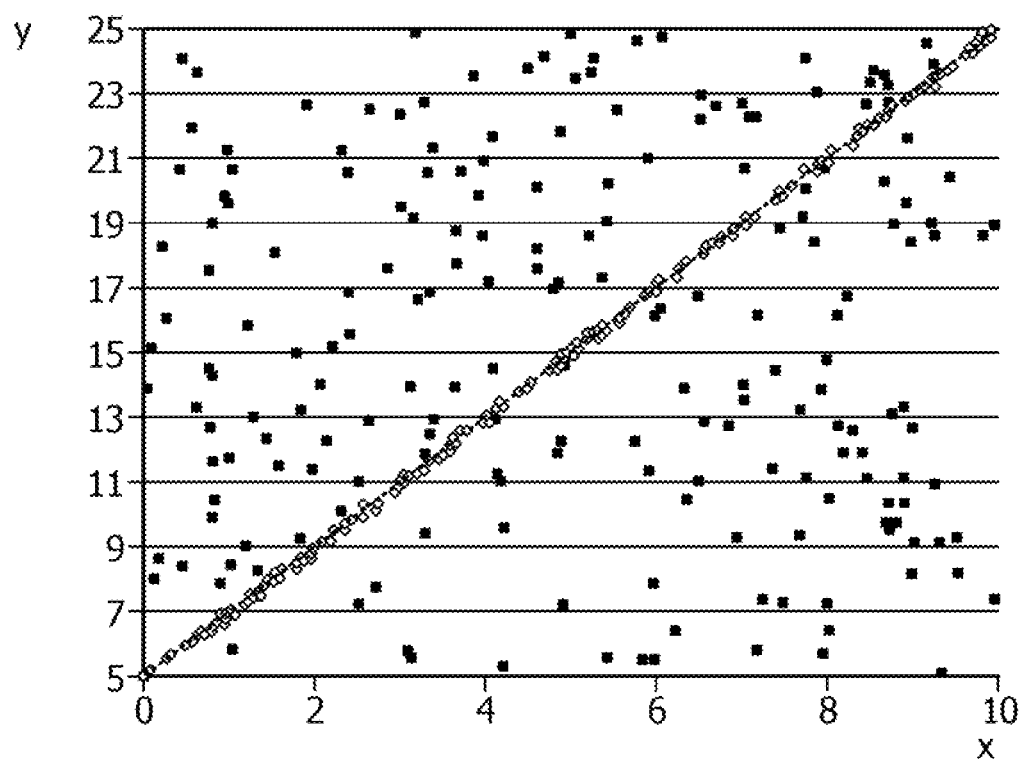
FIG. 6 is a diagram (1) for explaining a calculation example of the RANSAC.

FIG. 5 is a diagram illustrating an example of the set Q reconstructed by the RANSAC. FIG. 5 is an example in which parameters on a two-dimensional space are estimated and feature points, which are not noise, are extracted. The parameters on the two-dimensional space are a tilt and an intercept of a straight line. The set Q of the feature points, which are not noise, is feature points between broken lines 46a and 46b.

A calculation example of the RANSAC is explained. FIGS. 6 to 11 are diagrams for explaining a calculation example of the RANSAC. In FIGS. 6 to 11, the horizontal axis is an x axis and the vertical axis is a y axis. An example is explained in which a straight line (y=ax+b) is estimated on a two-dimensional coordinate. Estimation target parameters are a tilt "a" and an intercept "b".

Conditions in performing the calculation by the RANSAC are represented as conditions B1, B2, and B3 described below.

Condition B1: Points present near the straight line of y=2x+5 are 200 points. The points present near the straight line are indicated by diamond marks. The points present near the straight line shift according to a normal distribution of a standard deviation 0.1 from the straight line.

Condition B2: Points arranged at random are 200 points. The points arranged at random are indicated by square marks. The points are arranged at random in a range of $0 \le x \le 10$ and $5 \le y \le 25$.

Condition B3: A straight line is estimated by the RANSAC in a state in which the 400 points in total are not distinguished.

Procedures of the calculation examples of the RANSAC are represented as a procedure C1, a procedure C2, a procedure C3, and a procedure C4.

Procedure C1: Five points are selected at random.

Procedure C2: The five points are regression-analyzed to calculate a and b.

Procedure C3: An absolute value difference in y coordinate are calculated between the estimated straight line (y=ax+b) and each of the input 400 points. The number of points with the absolute value differences equal to or smaller than 0.3 among the 400 points is counted as the number of votes.

Procedure C4: The procedures C1 to C3 are iterated to update, at any time, parameters with a large number of votes as optimum values in a present state.

Figure 7:
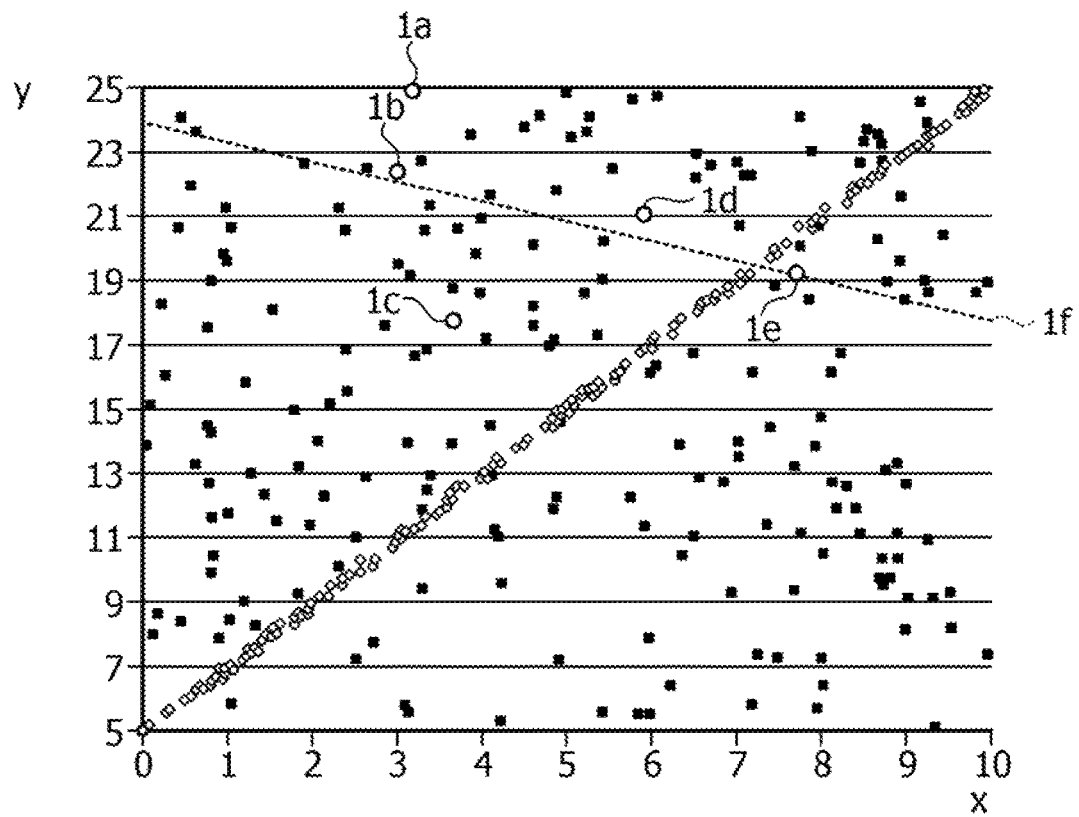
FIG. 7 is a diagram (2) for explaining a calculation example of the RANSAC.

An example of first calculation by the RANSAC is explained with reference to FIG. 7. In FIG. 7, an apparatus that executes the RANSAC selects points 1a to 1e at random out of the 400 points according to the procedure C1. The apparatus executes the regression analysis according to the procedure C2 to calculate a=−0.610 and b=23.9112. A straight line based on such a and b is a straight line 1f. When the apparatus calculates the number of votes according to the procedure C3, the number of votes is "6". In the first calculation, the apparatus initially sets an optimum value as "a=−0.610, b=23.9112, and the number of votes 6".

Figure 8:
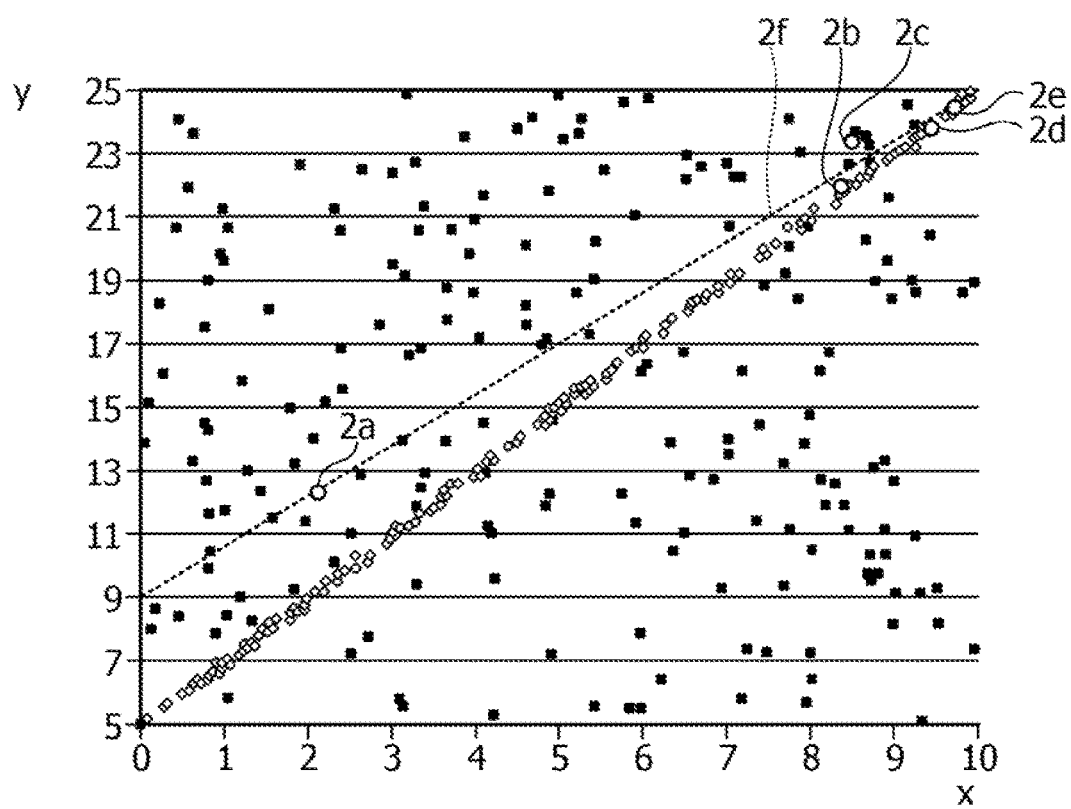
FIG. 8 is a diagram (3) for explaining a calculation example of the RANSAC.

An example of second calculation by the RANSAC is explained with reference to FIG. 8. In FIG. 8, the apparatus that executes the RANSAC selects points 2a to 2e at random out of the 400 points according to the procedure C1. The apparatus executes the regression analysis according to the procedure C2 to calculate a=1.596 and b=8.967. A straight line based on such a and b is a straight line 2f. When the apparatus calculates the number of votes according to the procedure C3, the number of votes is "29". When the apparatus compares the number of votes "6" of the optimum value and the number of votes "29" of the example of the second calculation according to the procedure C4, the number of votes of the example of the second calculation is larger. Therefore, the apparatus updates the optimum values to "a=1.596, b=8.967, and the number of votes 29".

Figure 9:
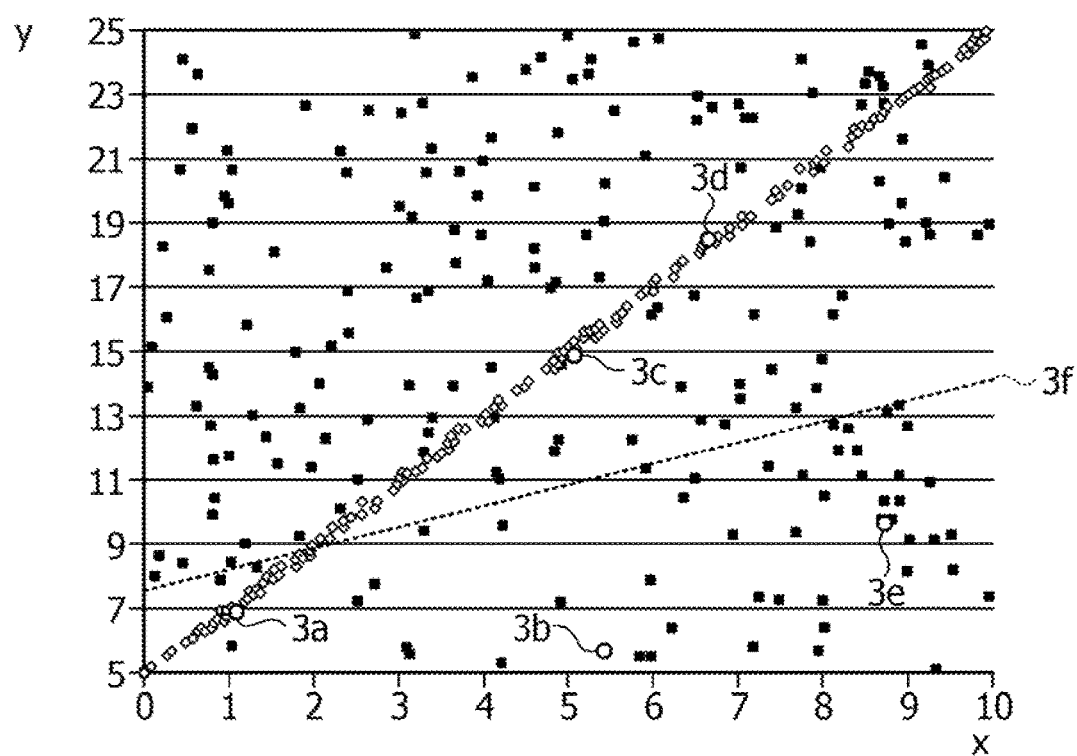
FIG. 9 is a diagram (4) for explaining a calculation example of the RANSAC.

An example of third calculation by the RANSAC is explained with reference to FIG. 9. In FIG. 9, the apparatus that executes the RANSAC selects points 3a to 3e at random out of the 400 points according to the procedure C1. The apparatus executes the regression analysis according to the procedure C2 to calculate a=0.660 and b=7.554. A straight line based on such a and b is a straight line 3f. When the apparatus calculates the number of votes according to the procedure C3, the number of votes is "19". When the apparatus compares the number of votes "29" of the optimum value and the number of votes "19" of the example of the third calculation according to the procedure C4, the number of votes of the optimum value is larger. Therefore, the apparatus keeps the optimum values as "a=1.596, b=8.967, and the number of votes 29".

Figure 10:
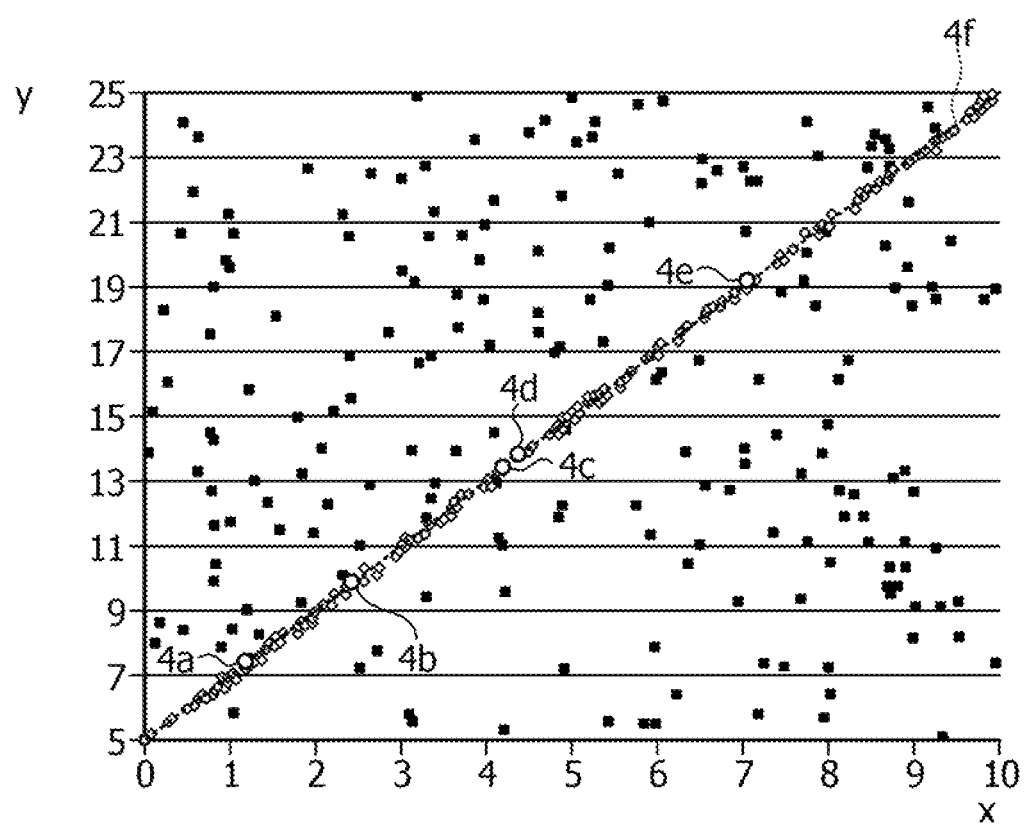
FIG. 10 is a diagram (5) for explaining a calculation example of the RANSAC.

An example of fourth calculation by the RANSAC is explained with reference to FIG. 10. In FIG. 10, the apparatus that executes the RANSAC selects points 4a to 4e at random out of the 400 points according to the procedure C1. The apparatus executes the regression analysis according to the procedure C2 to calculate a=2.037 and b=4.886. A straight line based on such a and b is a straight line 4f. When the apparatus calculates the number of votes according to the procedure C3, the number of votes is "195". When the apparatus compares the number of votes "29" of the optimum value and the number of votes "195" of the c example of the fourth calculation according to the procedure C4, the number of votes of the example of the fourth calculation is larger. Therefore, the apparatus updates the optimum values to "a=2.037, b=4.886, and the number of votes 195".

Figure 11:
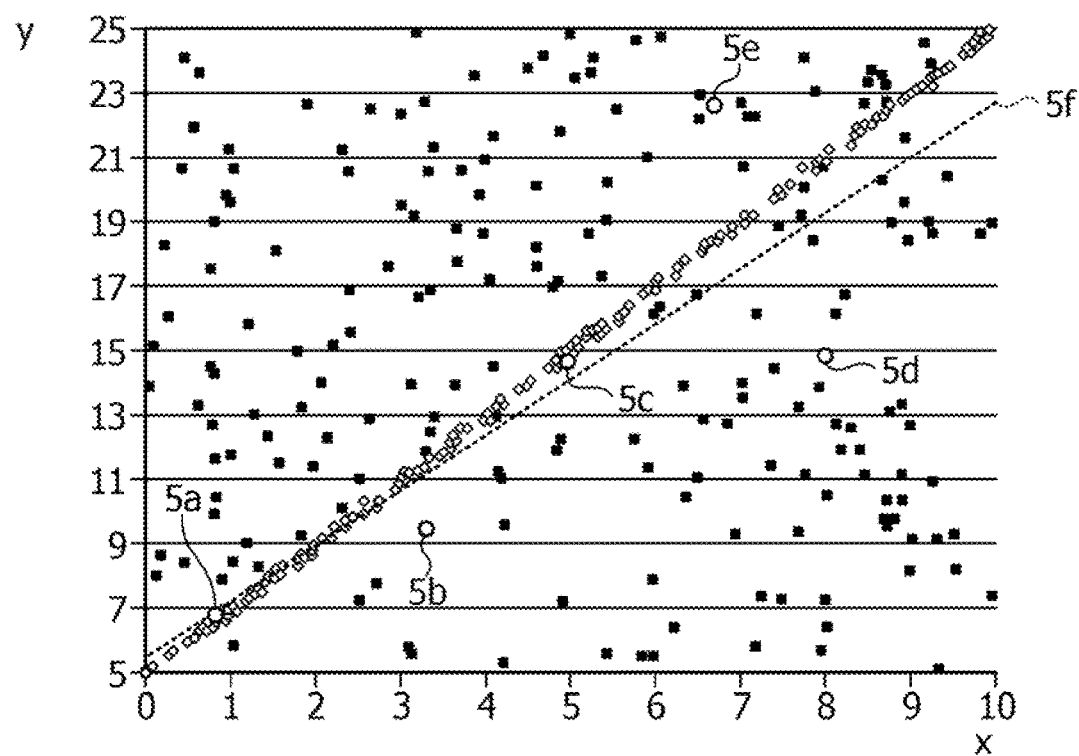
FIG. 11 is a diagram (6) for explaining a calculation example of the RANSAC.

An example of fifth calculation by the RANSAC is explained with reference to FIG. 11. In FIG. 11, the apparatus that executes the RANSAC selects points 5a to 5e at random out of the 400 points according to the procedure C1. The apparatus executes the regression analysis according to the procedure C2 to calculate a=1.725 and b=5.454. A straight line based on such a and b is a straight line 5f. When the apparatus calculates the number of votes according to the procedure C3, the number of votes is "53". When the apparatus compares the number of votes "195" of the optimum value and the number of votes "53" of the example of the fifth calculation according to the procedure C4, the number of votes of the optimum value is larger. Therefore, the apparatus keeps the optimum values as "a=2.037, b=4.886, and the number of votes 195".

As explained above, for example, by performing the calculation by the RANSAC, the optimum values "a=2.037, b=4.886, and the number of votes 195" are estimated.

Processing by the shape estimating apparatus according to this embodiment is explained. FIGS. 12 to 16 are diagrams for explaining the processing by the shape estimating apparatus according to this embodiment. The shape estimating apparatus executes procedures X1 to X6 in order.

Processing of the procedure X1 of the shape estimating apparatus is explained with reference to FIG. 12. The shape estimating apparatus executes the SfM on image information 60 and image information 61 to estimate a three-dimensional shape of a stationary subject. Although not illustrated in the figure, the shape estimating apparatus may execute the SfM further using other image information other than the pieces of image information 60 and 61.

The image information 60 is information on an image photographed by the camera 50 at time t1. The image information 61 is information on an image photographed by the camera 50 at time t2. The position of the camera at time t1 and the position of the camera at time t2 are different. The pieces of image information 60 and 61 include a subject 60a and a subject 60b. The subject 60a is a stationary object and the subject 60b is a moving body.

After executing the procedure by the RANSAC and removing noise included in the image information 60 and 61, the shape estimating apparatus executes the SfM to estimate a three-dimensional shape 70a of the subject 60a. Note that, since the subject 60b is the moving body, the subject 60b is regarded as noise and removed by the RANSAC.

Figure 13:
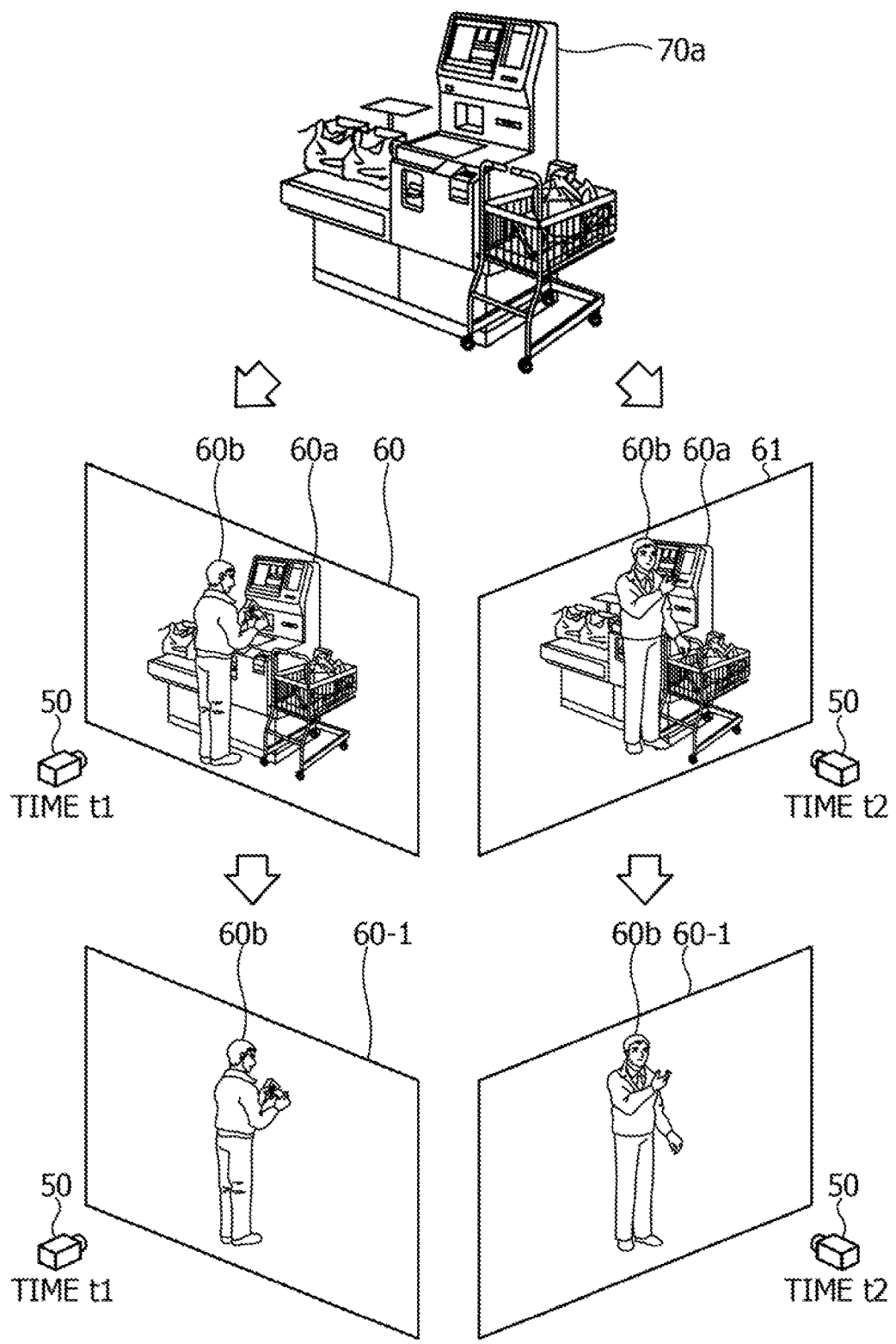
FIG. 13 is a diagram (2) for explaining processing by the shape estimating apparatus according to the embodiment.

Processing of the procedure X2 of the shape estimating apparatus is explained with reference to FIG. 13. The shape estimating apparatus deletes, from the image information 60 and 61, a region corresponding to the three-dimensional shape 70a of the subject 60a estimated in the procedure X1. In other words, the shape estimating apparatus may remove some feature points from estimation candidates by deleting a region corresponding to the three-dimensional shape 70a of the subject 60a estimated in the procedure X1. The some feature points correspond to the three-dimensional shape 70a.

The shape estimating apparatus projects the three-dimensional shape 70a on the image information 60 and specifies and removes a region of the subject 60a corresponding to the three-dimensional shape 70a to generate image information 60-1. The shape estimating apparatus projects the three-dimensional shape 70a on the image information 61 and specifies and removes the region of the subject 60a corresponding to the three-dimensional shape 70a to generate image information 61-1.

Processing of the procedure X3 of the shape estimating apparatus is explained with reference to FIG. 14. When the shape estimating apparatus executes the RANSAC on the image information 60-1 and the image information 61-1, a portion with a large movement and a small area in the subject 60b is removed as noise. Portions of legs and a body with a small movement and a large area remain. The shape estimating apparatus executes the SfM on the remaining portions to estimate a three-dimensional shape 70b.

Processing of the procedure X4 of the shape estimating apparatus is explained. The shape estimating apparatus projects the three-dimensional shape 70b on the image information 60-1 and specifies and removes a region of the image information 60-1 corresponding to the three-dimensional shape 70b to generate image information 60-2. The shape estimating apparatus projects the three-dimensional shape 70b on the image information 61-1 and specifies and removes the region of the image information 61-1 corresponding to the three-dimensional shape 70b to generate image information 61-2.

Processing of the procedure X5 of the shape estimating apparatus is explained with reference to FIG. 15. When the shape estimating apparatus executes the RANSAC on the image information 60-2 and the image information 61-2, for example, a face with the largest area in the subject 60c remains. The other portions are removed as noise. The shape estimating apparatus executes the SfM on the remaining face to estimate a three-dimensional shape 70c.

The procedure X6 of the shape estimating apparatus is explained with reference to FIG. 16. The shape estimating apparatus integrates the three-dimensional shapes 70a to 70c estimated in the procedures X1 to X5. When performing the integration, the shape estimating apparatus receives designation of reference time, converts three-dimensional coordinates of the three-dimensional shapes 70a to 70c according to the received time, and thereafter executes combination.

Y1 in FIG. 16 illustrates an example in which the three-dimensional shapes 70a to 70c are integrated based on time t1. As illustrated in Y1, the three-dimensional shapes 70a to 70c are integrated to obtain a three-dimensional shape 80a. Y2 in FIG. 16 illustrates an example in which the three-dimensional shapes 70a to 70c are integrated based on time t2. As illustrated in Y2, the three-dimensional shapes 70a to 70c are integrated to obtain a three-dimensional shape 80b.

Figure 17:
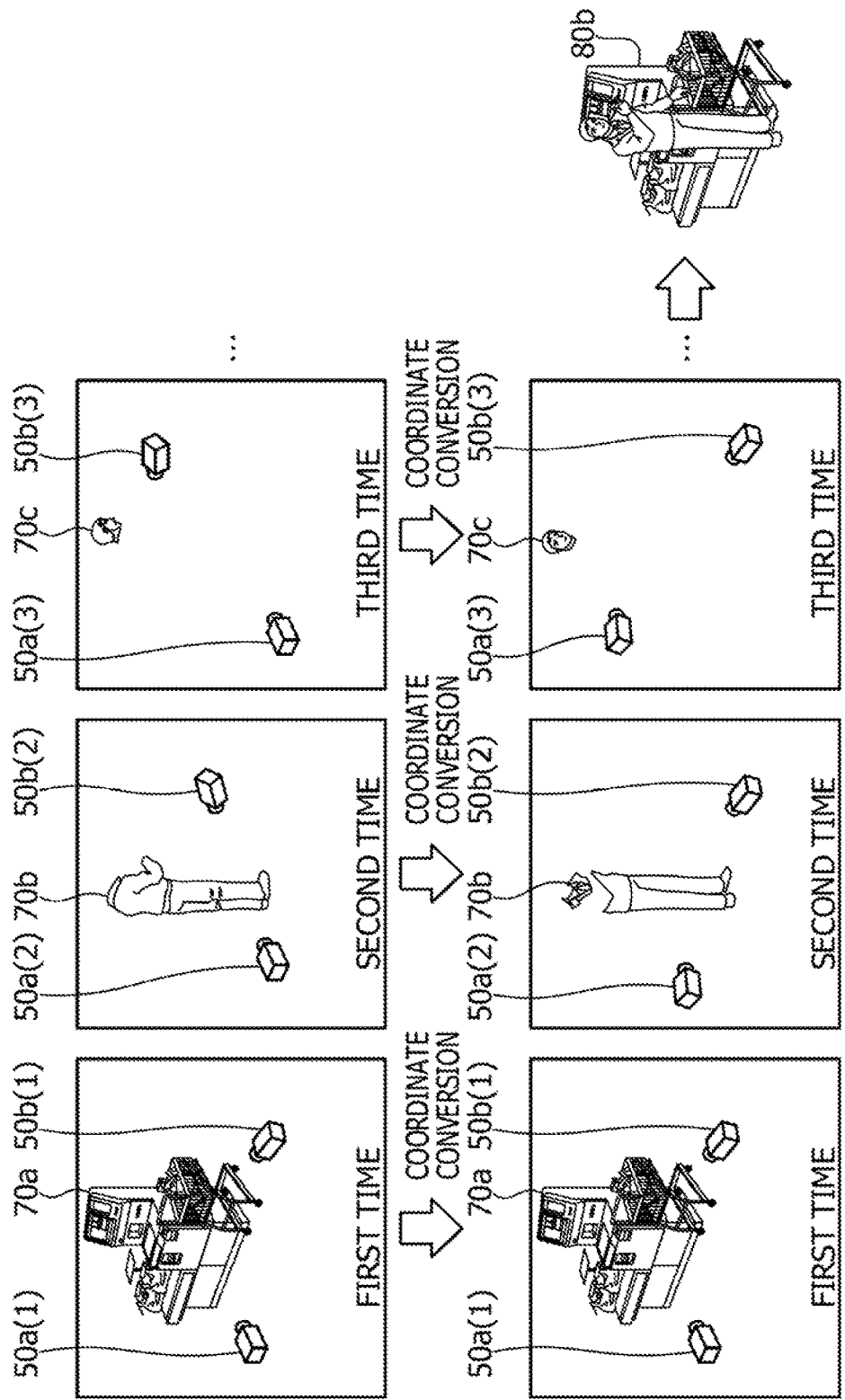
FIG. 17 is a diagram for explaining coordinate conversion of a three-dimensional shape.

FIG. 17 is a diagram for explaining coordinate conversion of three-dimensional shapes. When the shape estimating apparatus iteratively executes the SfM and estimates the three-dimensional shapes 70a, 70b, and 70c, a relative relation of the camera 50 varies.

When the shape estimating apparatus executes first SfM to estimate the three-dimensional shape 70a, the position of the camera 50 (time t1) is represented as a position 50a(1) and the position of the camera 50 (time t2) is represented as a position 50b(1). When the shape estimating apparatus executes second SfM to estimate the three-dimensional shape 70b, the position of the camera 50 (time t1) is represented as a position 50a(2) and the position of the camera 50 (time t2) is represented as a position 50b(2). When the shape estimating apparatus executes third SfM to estimate the three-dimensional shape 70c, the position of the camera 50 (time t1) is represented as a position 50a(3) and the position of the camera 50 (time t2) is represented as a position 50b(3).

Relative positions of the position 50a(1) and the position 50b(1) are represented as relative positions (1). Relative positions of the position 50a(2) and the position 50b(2) are represented as relative positions (2). Relative positions of the position 50a(3) and the position 50b(3) are represented as relative positions (3). Then, the relative positions (1), the relative positions (2), and the relative positions (3) are different.

The shape estimating apparatus performs coordinate conversion of the three-dimensional shapes 70a to 70c to change the relative positions (1), the relative positions (2), and the relative positions (3) to be the same and thereafter performs integration. In an example illustrated in FIG. 17, the shape estimating apparatus performs the coordinate conversion of the three-dimensional shapes 70a to 70c based on the positions 50b(1) to 50b(3) of the camera, which performs photographing at time t2, and performs integration to obtain the three-dimensional shape 80b.

Figure 18:
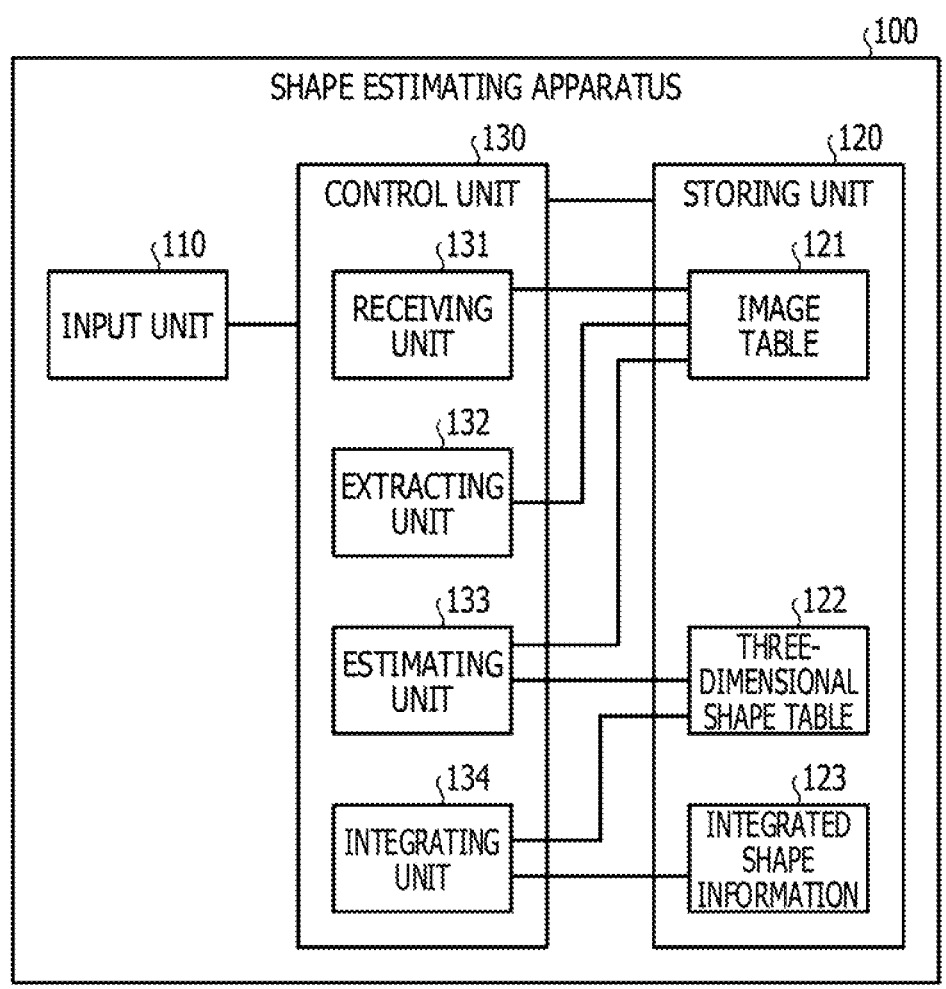
FIG. 18 is a functional block diagram illustrating the configuration of the shape estimating apparatus according to the embodiment.

The configuration of the shape estimating apparatus according to this embodiment is explained. FIG. 18 is a functional block diagram illustrating the configuration of the shape estimating apparatus according to this embodiment. As illustrated in FIG. 18, a shape estimating apparatus 100 includes an input unit 110, a storing unit 120, and a control unit 130.

The input unit 110 is an input interface that receives input of image information photographed by the camera 50 at different times. The input unit 110 outputs multiple pieces of image information to the control unit 130. Information on the photographing times is given to the image information received by the input unit 110.

The storing unit 120 includes an image table 121, a three-dimensional shape table 122, and an integrated shape information 123. The storing unit 120 corresponds to a semiconductor memory device such as a random access memory (RAM), a read only memory (ROM), or a flash memory or a storage device such as a hard disk drive (HDD).

The image table 121 is a table that retains information on image information. FIG. 19 is a diagram illustrating an example of a data structure of the image table. As illustrated in FIG. 19, the image table 121 associates photographing time, image information, and feature point information. The photographing time indicates time when the camera 50 photographs an image. The image information is information on the image photographed by the camera at the relevant photographing time. The feature point information is information on feature points calculated from a photographed image based on an SIFT feature value. The information on the feature points has, for example, two-dimensional coordinates of the feature points, feature values of the feature points, and the like.

The three-dimensional shape table 122 includes information on a three-dimensional shape estimated by executing the SfM. FIG. 20 is a diagram illustrating an example of a data structure of the three-dimensional shape table. As illustrated in FIG. 20, the three-dimensional table 122 associates identification information, a three-dimensional shape, and a parameter. The identification information is information uniquely identifying three-dimensional shapes before integration. The three-dimensional shape is information indicating three-dimensional coordinates (q1 to qi) of map points forming the three-dimensional shape. The parameter is information indicating parameters (p1 to pi) of the camera at a point in time when the three-dimensional shape is estimated. As explained above, the parameter pi corresponds to arrangement of Ai, Ri, and Ti.

The integrated shape information 123 is information obtained as a result of integrating the three-dimensional shapes of the three-dimensional shape table 122.

Referring back to FIG. 18, the control unit 130 includes a receiving unit 131, an extracting unit 132, an estimating unit 133, and an integrating unit 134. The control unit 130 may be realized by a central processing unit (CPU), a micro processing unit (MPU), or the like. The control unit 130 may also be realized by a hardwired logic such as an application specific integrated circuit (ASIC) or a field programmable gate array (FPGA).

The receiving unit 131 is a processing unit that receives multiple pieces of image information from the input unit 110. The receiving unit 131 stores photographing time and image information in the image table 121 in association with each other. The receiving unit 131 iterates the processing every time image information is received from the input unit 110.

The extracting unit 132 is a processing unit that extracts feature points from the respective pieces of image information stored in the image table 121 and stores information on the extracted feature points in the image table 121 in association with the image information. For example, the extracting unit 132 calculates feature points and feature values corresponding to the feature points based on an SIFT feature value of the image information.

The estimating unit 133 is a processing unit that iterates removal of noise by the RANSAC and estimation of a three-dimensional shape by the SfM based on the image information photographed at the photographing times and the information on the feature points to estimate a three-dimensional shape at every stage. For example, processing by the estimating unit 133 corresponds to the processing of the procedures X1 to X5 explained above.

Figure 12:
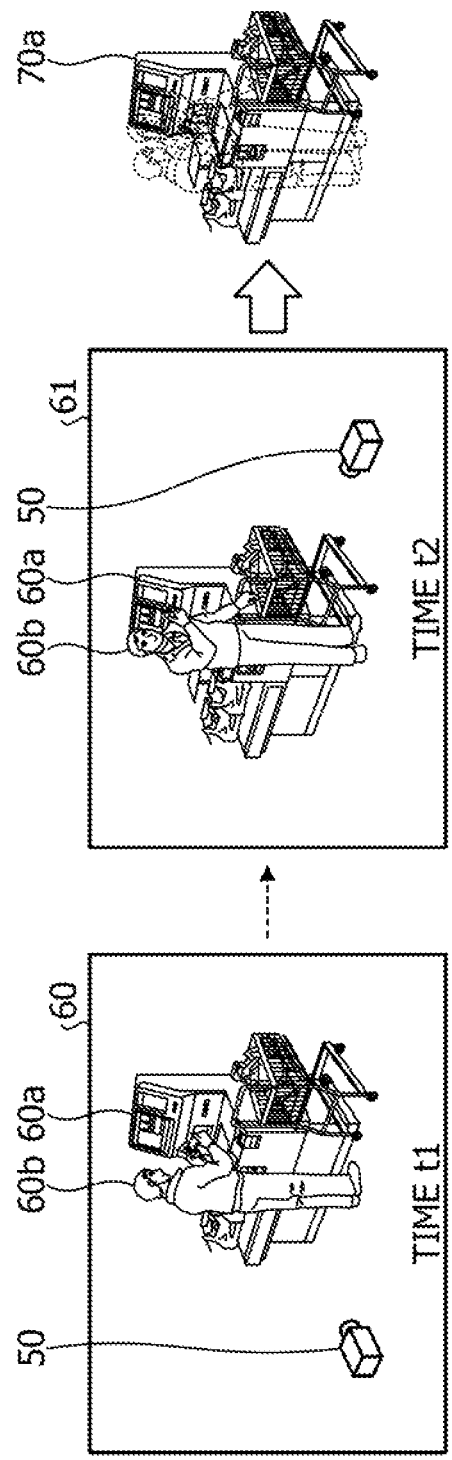
FIG. 12 is a diagram (1) for explaining processing by a shape estimating apparatus according to an embodiment.

The estimating unit 133 executes the processing of the procedure X1 illustrated in FIG. 12 to estimate the map points q1 to qi of the three-dimensional shape 70a and the parameters p1 to pi of the camera at that point and registers the map points q1 to qi and the parameters p1 to pi in the three-dimensional shape table 122. The estimating unit 133 executes the processing of the procedure X2 illustrated in FIG. 13 to delete a region corresponding to the three-dimensional shape 70a from pieces of image information photographed at respective times to generate the image information 60-1 and 61-1.

Figure 14:
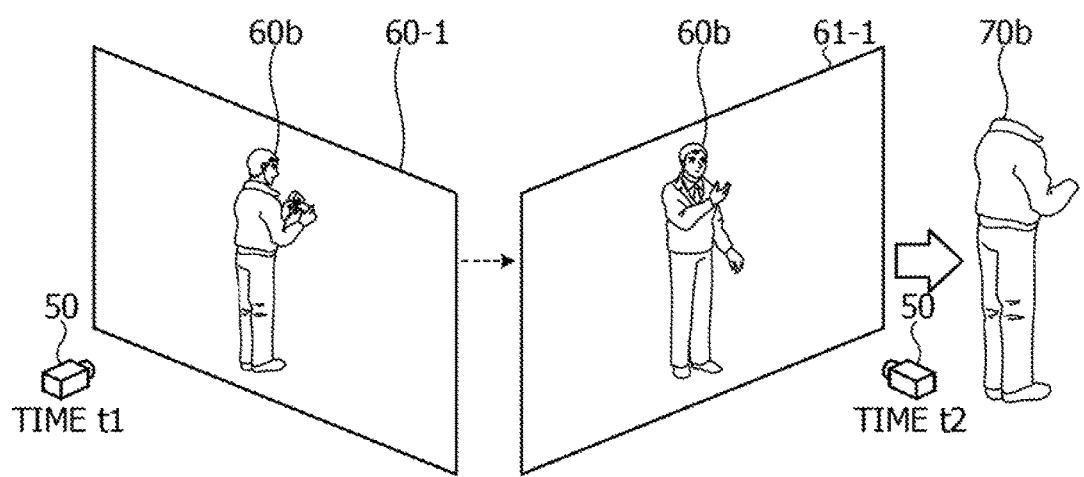
FIG. 14 is a diagram (3) for explaining processing by the shape estimating apparatus according to the embodiment.

The estimating unit 133 executes the procedure X3 illustrated in FIG. 14 to estimate the map points q1 to qi of the three-dimensional shape 70b and the parameters p1 to pi of the camera at that point and registers the map points q1 to qi and the parameters p1 to pi in the three-dimensional shape table 122. The estimating unit 133 executes the processing of the procedure X4 to delete a region corresponding to the three-dimensional shape 70b from the image information 60-1 and 61-1 to generate the image information 60-2 and 61-2.

Figure 15:
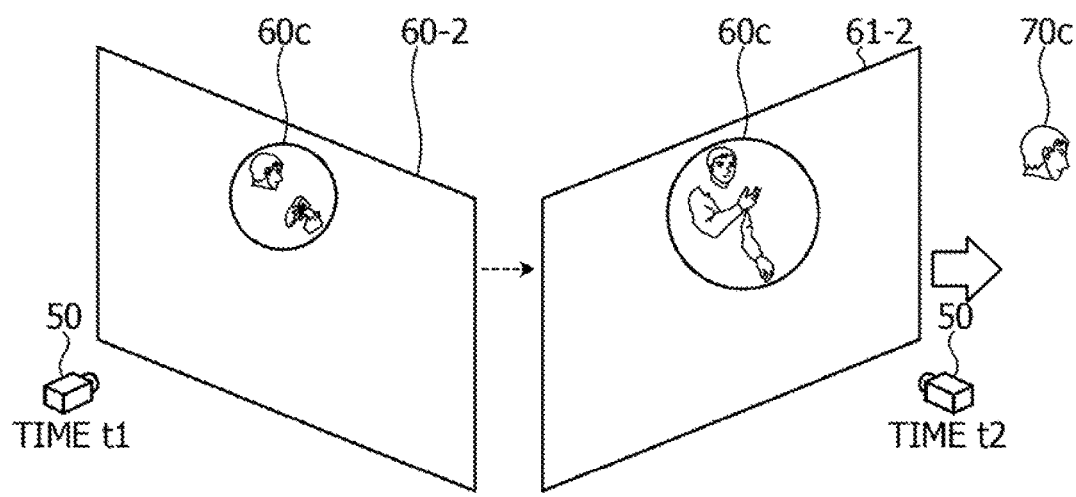
FIG. 15 is a diagram (4) for explaining processing by the shape estimating apparatus according to the embodiment.

The estimating unit 133 executes the procedure X5 illustrated in FIG. 15 to estimate the map points q1 to qi of the three-dimensional shape 70c and the parameters p1 to pi of the camera at that point and registers the map points q1 to qi and the parameters p1 to pi in the three-dimensional shape table 122.

Figure 21:
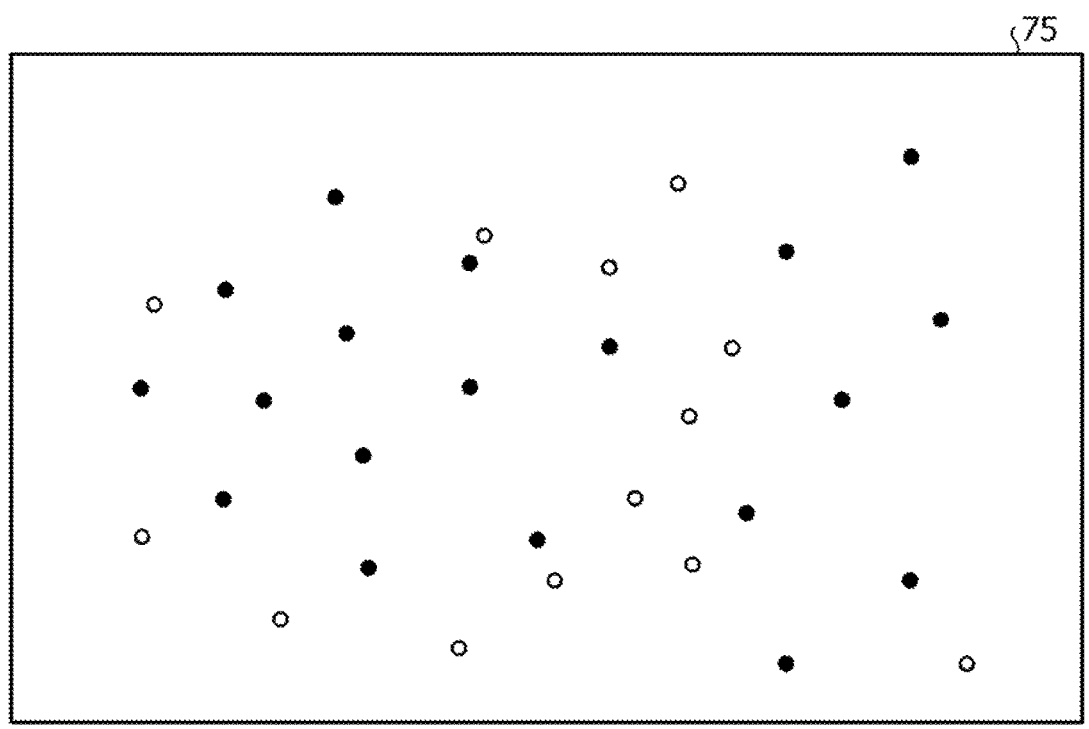
FIG. 21 is a diagram (1) for explaining an example of processing for deleting a region of image information corresponding to a three-dimensional shape.
Figure 22:
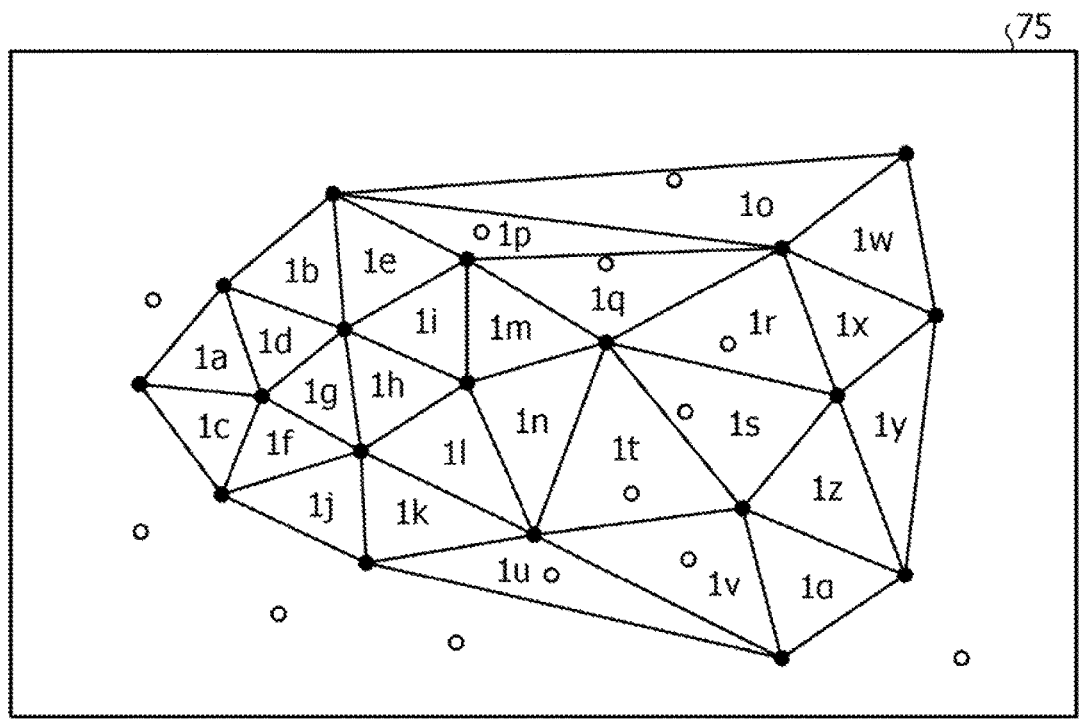
FIG. 22 is a diagram (2) for explaining the example of the processing for deleting the region of the image information corresponding to the three-dimensional shape.
Figure 23:
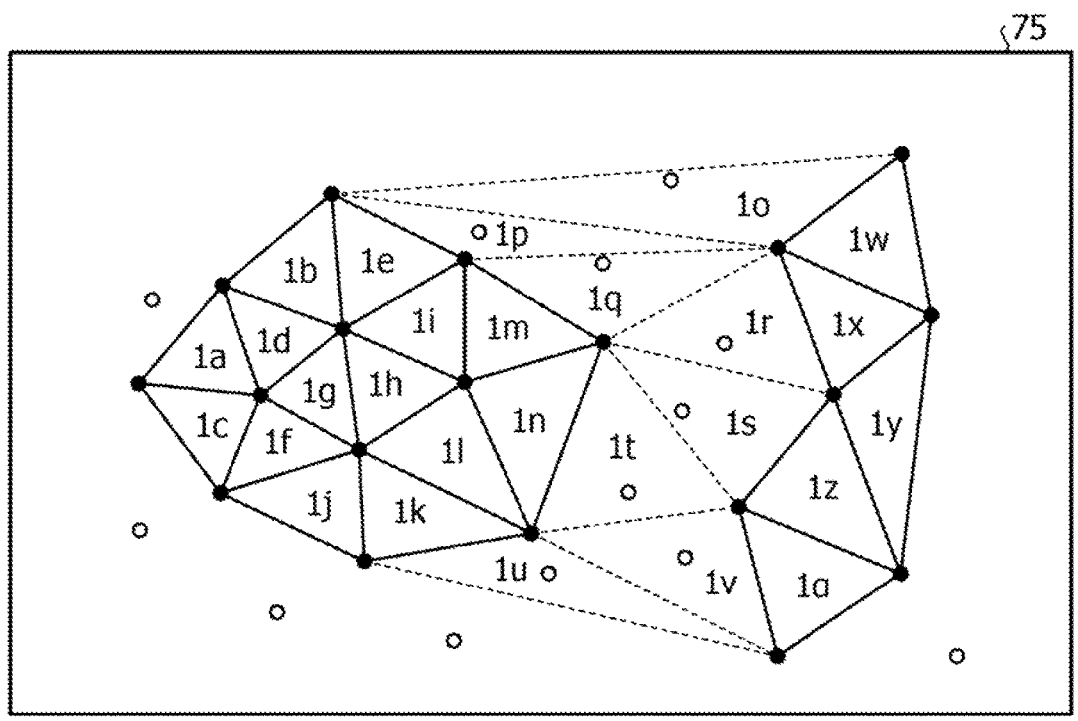
FIG. 23 is a diagram (3) for explaining the example of the processing for deleting the region of the image information corresponding to the three-dimensional shape.

An example of processing in which the estimating unit 133 deletes a region of image information corresponding to a successfully estimated three-dimensional shape is explained. FIGS. 21 to 23 are diagrams for explaining an example of processing for deleting a region of image information corresponding to a three-dimensional shape. Referring to FIG. 21, black circles and white circles of image information 75 are feature points extracted from the image information 75. The black circles indicate feature points corresponding to map points of a successfully estimated three-dimensional shape. The white circles correspond to the other feature points. In the following explanation, the black circles are referred to as first feature points and the white circles are referred to as second feature points as appropriate.

Referring to FIG. 22, the estimating unit 133 performs Delaunay triangle division on a region including the first feature points. In an example illustrated in FIG. 22, the estimating unit 133 divides the region into regions 1a to 1α.

Referring to FIG. 23, concerning the regions 1a to 1α, the estimating unit 133 determines, according to how many second feature points are included, a region to be deleted. For example, when the number of the second feature points included in a certain region is smaller than a threshold, the estimating unit 133 deletes the relevant certain region. For example, in an example illustrated in FIG. 23, the estimating unit 133 deletes the regions 1a to 1n and the regions 1w to 1α and leaves the regions 1o to 1v.

Referring to FIG. 18, the integrating unit 134 is a processing unit that integrates the three-dimensional shapes stored in the three-dimensional shape table 122 to generate the integrated shape information 123. In the integrating unit 134, photographing time of the camera set as a reference in combining the three-dimensional shapes is designated beforehand.

Parameters of the camera estimated by k-th repetition processing (SfM) and positions of three-dimensional shapes are defined as described below.

Ai(k): A 3×3 camera matrix of the camera that photographs i-th image information.

Ri(k): A 3×3 rotation matrix of the camera that photographs the i-th image information.

Ti(k): A 3×1 translation component of the camera that photographs the i-th image information qj(k): Three-dimensional coordinates of a j-th feature point (map point)

Figure 24:
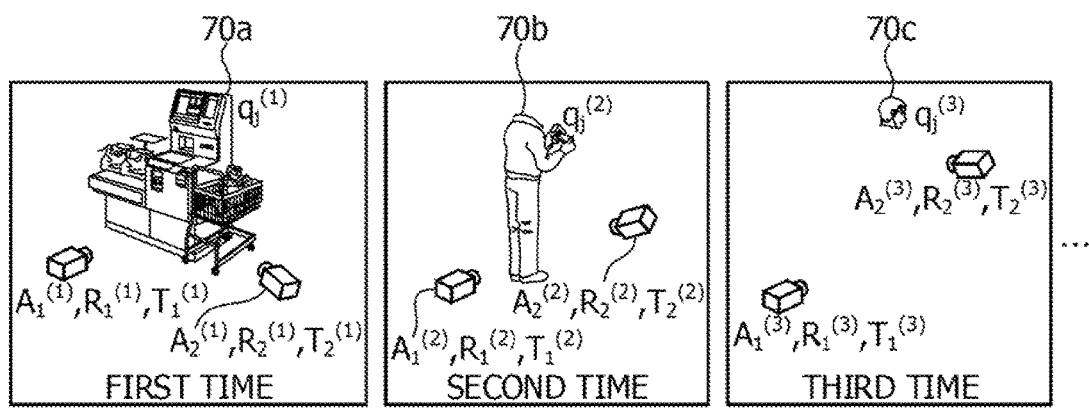
FIG. 24 is a diagram (1) for explaining processing by an integrating unit.
Figure 25:
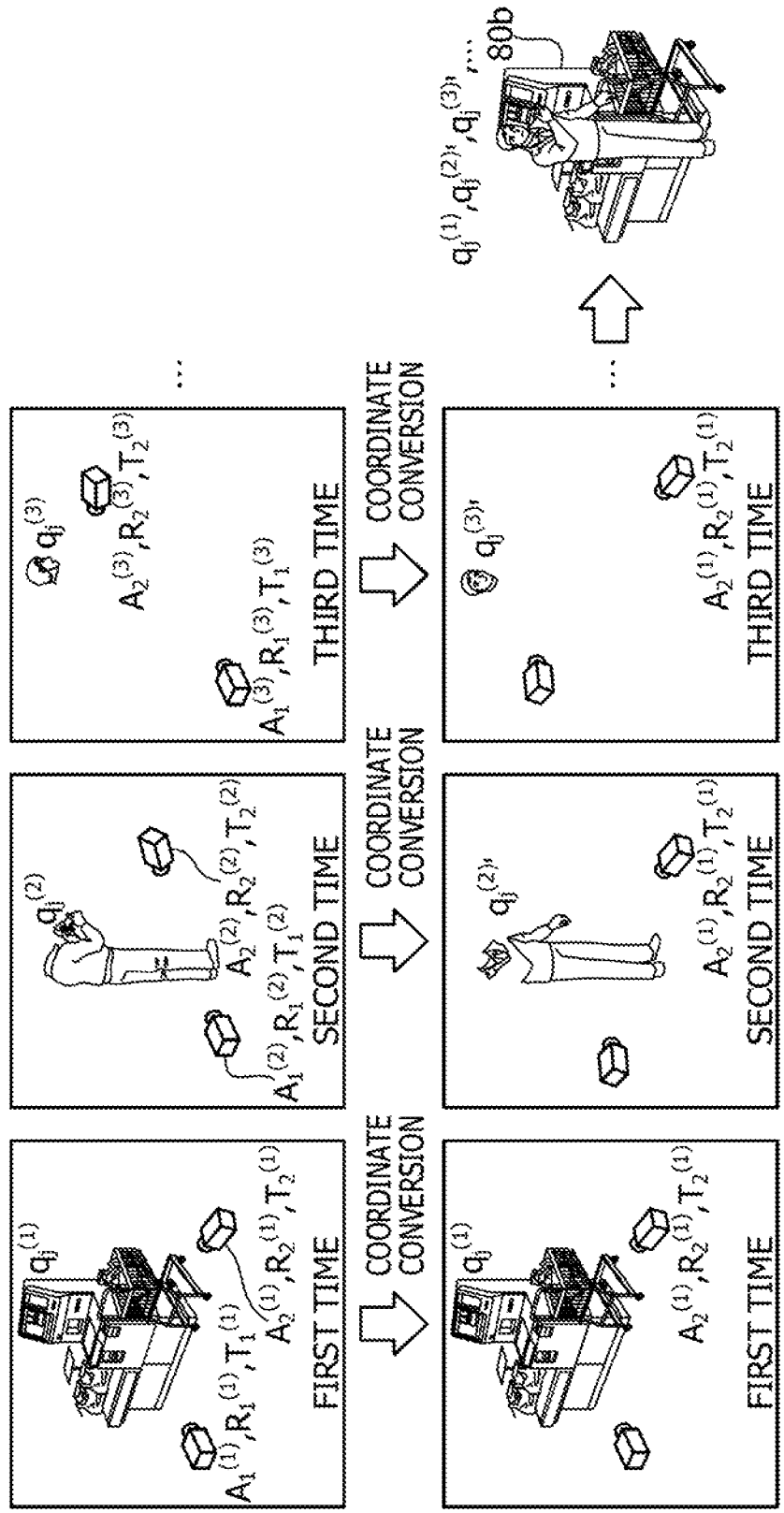
FIG. 25 is a diagram (2) for explaining processing by the integrating unit.

FIGS. 24 and 25 are diagrams for explaining processing by the integrating unit. In FIGS. 24 and 25, as an example, the three-dimensional shapes 70a, 70b, and 70c are integrated based on parameters of the camera at time t2.

Referring to FIG. 24, coordinates of map points of the three-dimensional shape 70a estimated by the first SfM is represented as qj(1). Parameters, which are estimated by the first SfM, of the camera 50 that photographs an image at time t1 are represented as A1(1), R1(1), and T1(1). Parameters, which are estimated by the first SfM, of the camera 50 that photographs an image at time t2 are represented as A2(1), R2(1), and T2(1).

Coordinates of map points of the three-dimensional shape 70b estimated by the second SfM are represented as qj(2). Parameters, which are estimated by the second SfM, of the camera 50 that photographs an image at time t1 are represented as A1(2), R1(2), and T1(2). Parameters, which are estimated by the second SfM, of the camera 50 that photographs an image at time t2 are represented as A2(2), R2(2), and T2(2).

Coordinates of map points of the three-dimensional shape 70c estimated by the third SfM are represented as qj(3). Parameters, which are estimated by the third SfM, of the camera 50 that photographs an image at time t1 are represented as A1(3), R1(3), and T1(3). Parameters, which are estimated by the third SfM, of the camera 50 that photographs an image at time t2 are represented as A2(3), R2(3), and T2(3).

Referring to FIG. 25, when integrating the three-dimensional shapes 70a, 70b, and 70c based on parameters of the camera at time t2, the integrating unit 134 equalizes all parameters of the camera that photographs image information at time t2. For example, the integrating unit 134 standardizes the camera parameters A2(1), R2(1), T2(1), A2(2), R2(2), T2(2), A2(3), R2(3), and T2(3) as "A2(1), R2(1), and T2(1)". The integrating unit 134 converts qj(k) of the three-dimensional shapes according to such processing.

First processing for performing coordinate conversion of qj(1) of the three-dimensional shape is explained. Since values of the camera parameters A2(1), R2(1), and T2(1) do not change, the integrating unit 134 keeps qj(1) as it is.

Second processing for converting qj(2) of the three-dimensional shape is explained. The camera parameters A2(2), R2(2), and T2(2) are standardized as "A2(1), R2(1), and T2(1)". Therefore, the integrating unit 134 converts the coordinates qj(2) of map points of the three-dimensional shape 70b into qj(2)' according to processing for converting A2(2), R2(2), and T2(2) into "A2(1), R2(1), and T2(1)".

Third processing for converting qj(3) of the three-dimensional shape is explained. The camera parameters A2(3), R2(3), and T2(3) are standardized as "A2(1), R2(1), and T2(1)". Therefore, the integrating unit 134 converts coordinates qj(3) of map points of the three-dimensional shape 70c into qj(3)' according to processing for converting A2(3), R2(3), and T2(3) into "A2(1), R2(1), and T2(1)".

After performing the coordinate conversion of the map points of the three-dimensional shapes 70b and 70c, the integrating unit 134 integrates the three-dimensional shapes 70a, 70b, and 70c to obtain the three-dimensional shape 80b after the integration. The integrating unit 134 causes the storing unit 120 to store information on the three-dimensional shape 80b as the integrated shape information 123.

Figure 26:
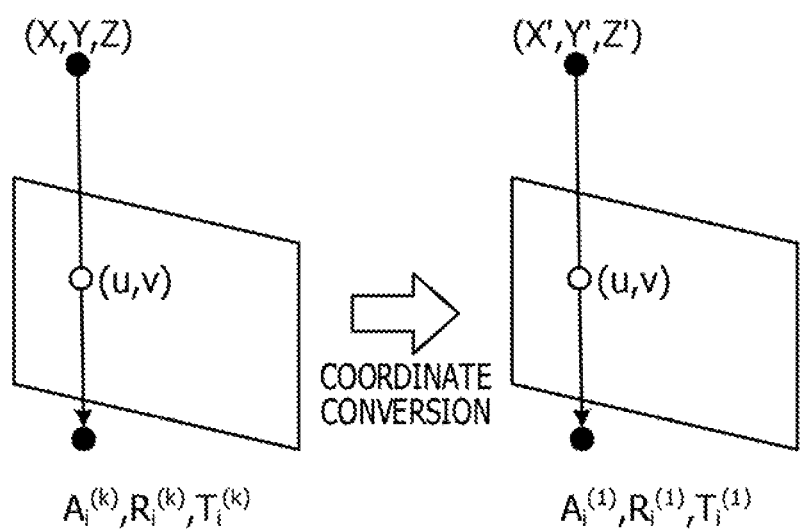
FIG. 26 is a diagram for explaining coordinate conversion.

An example of coordinate conversion executed by the integrating unit 134 is explained. FIG. 26 is a diagram for explaining the coordinate conversion. As illustrated in FIG. 26, three-dimensional coordinates of a certain map point are represented as (X, Y, Z) and two-dimensional coordinates of a projection point at the time of projection by parameters Ai(k), Ri(k), and Ti(k) of the camera is represented as (u, v). When the three-dimensional coordinates after the coordinate conversion are represented as (X', Y', Z'), Expressions (24) and (25) hold.

$$s \begin{pmatrix} u \\ v \\ 1 \end{pmatrix} = A_i^{(k)} \left[ R_i^{(k)} \begin{pmatrix} X \\ Y \\ Z \end{pmatrix} + T_i^{(k)} \right] \quad (24)$$

$$s \begin{pmatrix} u \\ v \\ 1 \end{pmatrix} = A_i^{(1)} \left[ R_i^{(1)} \begin{pmatrix} X' \\ Y' \\ Z' \end{pmatrix} + T_i^{(1)} \right] \quad (25)$$

Since the left side of Expression (24) and the left side of Expression (25) are equal, Expression (26) holds. Since the camera itself is the same, Ai(1) may be set equal to Ai(k). Consequently, Expression (26) changes to Expression (27). When Expression (27) is arranged, the three-dimensional coordinates (X', Y', Z') after the conversion may be represented by Expression (28).

$$A_i^{(1)} \left[ R_i^{(1)} \begin{pmatrix} X' \\ Y' \\ Z' \end{pmatrix} + T_i^{(1)} \right] = A_i^{(k)} \left[ R_i^{(k)} \begin{pmatrix} X \\ Y \\ Z \end{pmatrix} + T_i^{(k)} \right] \quad (26)$$

$$R_i^{(1)} \begin{pmatrix} X' \\ Y' \\ Z' \end{pmatrix} + T_i^{(1)} = R_i^{(k)} \begin{pmatrix} X \\ Y \\ Z \end{pmatrix} + T_i^{(k)} \quad (27)$$

$$\begin{pmatrix} X' \\ Y' \\ Z' \end{pmatrix} = R_i^{(1)-1} \left[ R_i^{(k)} \begin{pmatrix} X \\ Y \\ Z \end{pmatrix} + T_i^{(k)} - T_i^{(1)} \right] \quad (28)$$

According to a result of Expression (28), when the camera parameters Ai(k), Ri(k), and Ti(k) corresponding to the three-dimensional coordinates qj(k) of the map points are converted into Ai(1), Ri(1), and Ti(1), three-dimensional coordinates qj(k)' after the conversion may be represented by Expression (29). Ai(k) is set equal to Ai(1).

$$q_j^{(k)'} = R_i^{(1)-1}[R_i^{(k)} q_i^{(k)} + T_i^{(k)} - T_i^{(1)}] \quad (29)$$

The integrating unit 134 calculates qj(2)' and qj(3)' based on Expression (29). The integrating unit 134 combines qj(1), qj(2)', and qj(3)' to reconstruct the three-dimensional shape 80b.

Figure 27:
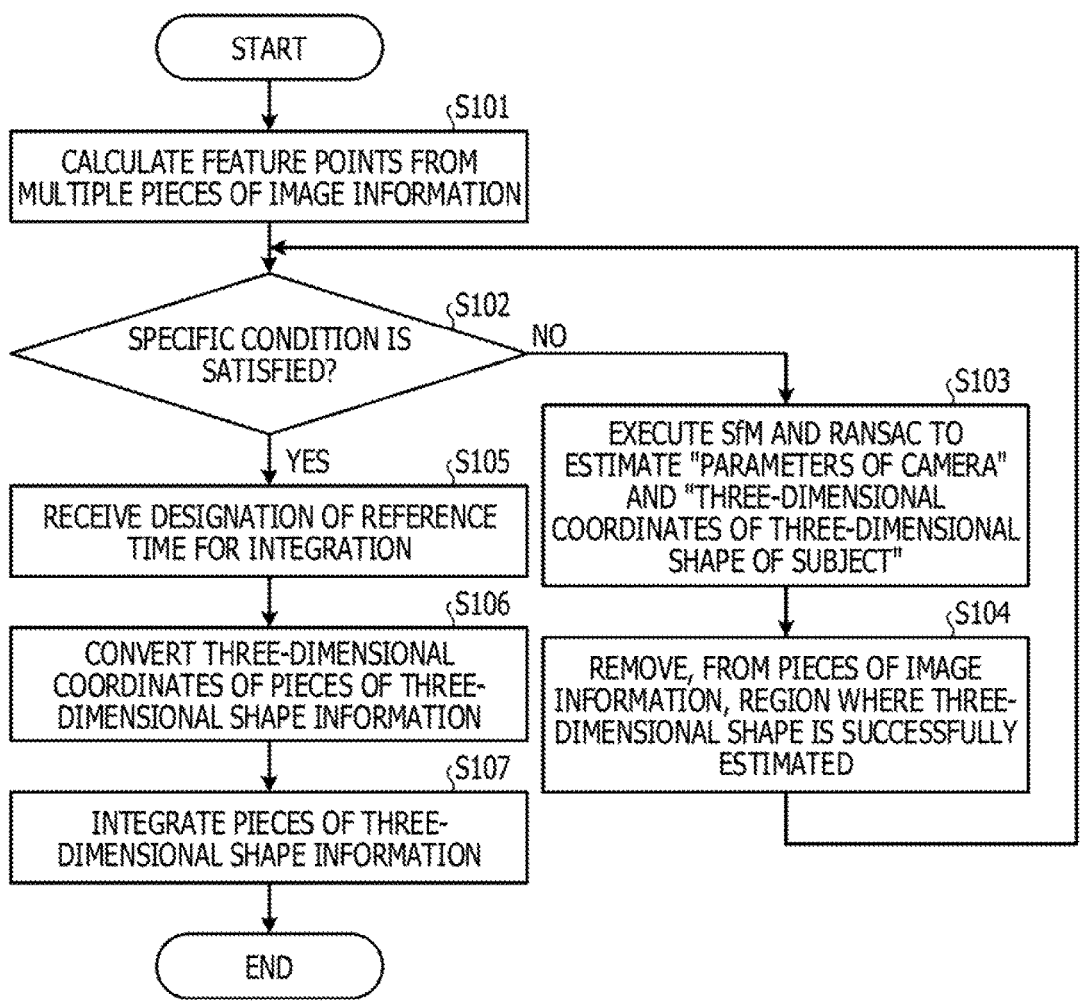
FIG. 27 is a flowchart illustrating a processing procedure of the shape estimating apparatus according to the embodiment.

A processing procedure of the shape estimating apparatus 100 according to this embodiment is explained. FIG. 27 is a flowchart illustrating a processing procedure of the shape estimating apparatus according to this embodiment. As illustrated in FIG. 27, the extracting unit 132 of the shape estimating apparatus 100 calculates feature points from multiple pieces of image information (step S101).

The estimating unit 133 of the shape estimating apparatus 100 determines whether a specific condition is satisfied (step S102). The specific condition is a condition that a ratio of an area of a region not deleted in image information is equal to or smaller than a threshold. Alternatively, the specific condition is a condition that the number of feature points extracted from the region not deleted in the image information is equal to or smaller than a threshold. The shape estimating apparatus 100 may use either one of the specific conditions or may use both of the specific conditions.

When the specific condition is not satisfied (No in step S102), the estimating unit 133 shifts to step S103. When the specific condition is satisfied (Yes in step S102), the estimating unit 133 shifts to step S105.

Step S103 is explained. The estimating unit 133 executes the SfM and the RANSAC to estimate the "parameter pi of the camera" and the "three-dimensional coordinates qi of the three-dimensional shape of the subject" (step S103). The estimating unit 133 removes, from the pieces of image information, a region where a three-dimensional shape may be estimated (step S104) and shifts to step S102.

Step S105 is explained. The integrating unit 134 of the shape estimating apparatus 100 receives designation of reference time in the case of integration (step S105). The integrating unit 134 converts three-dimensional coordinates of each of the pieces of three-dimensional shape information according to the reference time (step S106). The integrating unit 134 integrates all the pieces of three-dimensional shape information (step S107).

An effect of the shape estimating apparatus 100 according to this embodiment is explained. When succeeding in estimation of a three-dimensional shape by the SfM based on multiple pieces of image information of the subject photographed at different timings, the shape estimating apparatus 100 iterates processing for estimating a three-dimensional shape in the remaining region excluding a region of image information corresponding to the estimated three-dimensional shape. The shape estimating apparatus 100 integrates three-dimensional shapes estimated at stages to calculate a three-dimensional shape corresponding to the subject. Consequently, it is possible to estimate a three-dimensional shape of the subject from multiple pieces of image information photographed by one camera. Even if the subject is a moving body, it is possible to estimate a three-dimensional shape.

The shape estimating apparatus 100 converts, according to designated parameters of the camera, three-dimensional coordinates of the three-dimensional shapes estimated at the stages and thereafter performs integration. Consequently, it is possible to combine the three-dimensional shapes in a state in which a relative relation among the camera parameters estimated at the stages is standardized.

The shape estimating apparatus 100 divides a region on image information corresponding to a successfully estimated three-dimensional shape into multiple partial regions and removes, from the multiple partial regions, a partial region where a ratio of included feature points not corresponding to the three-dimensional shape is smaller than a threshold. Consequently, it is possible to appropriately remove, from the pieces of image information, a region not corresponding to the estimated three-dimensional shape.

Figure 28:
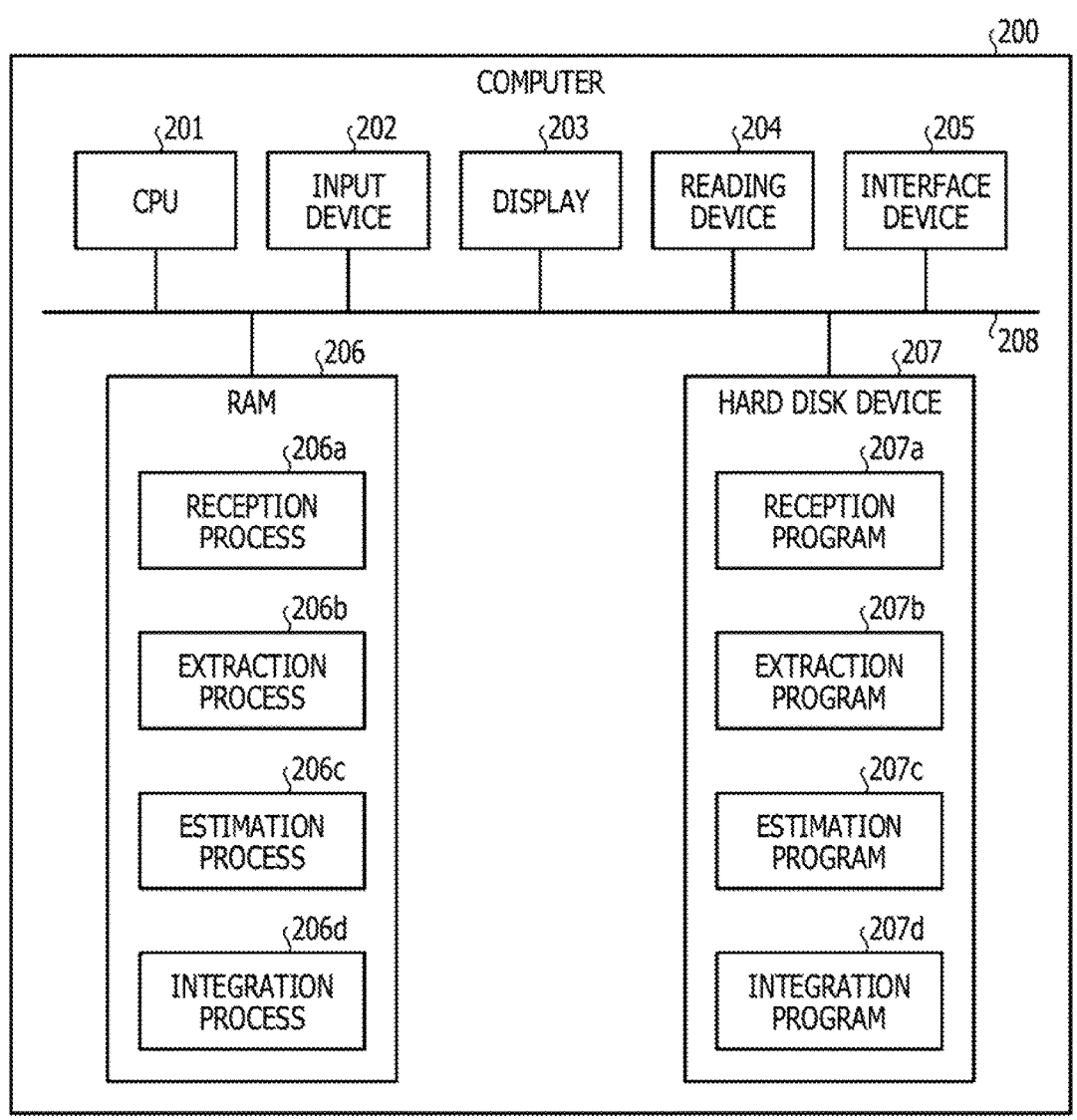
FIG. 28 is a diagram illustrating an example of a hardware configuration of a computer that realizes functions same as functions of the shape estimating apparatus.
Figure 29:
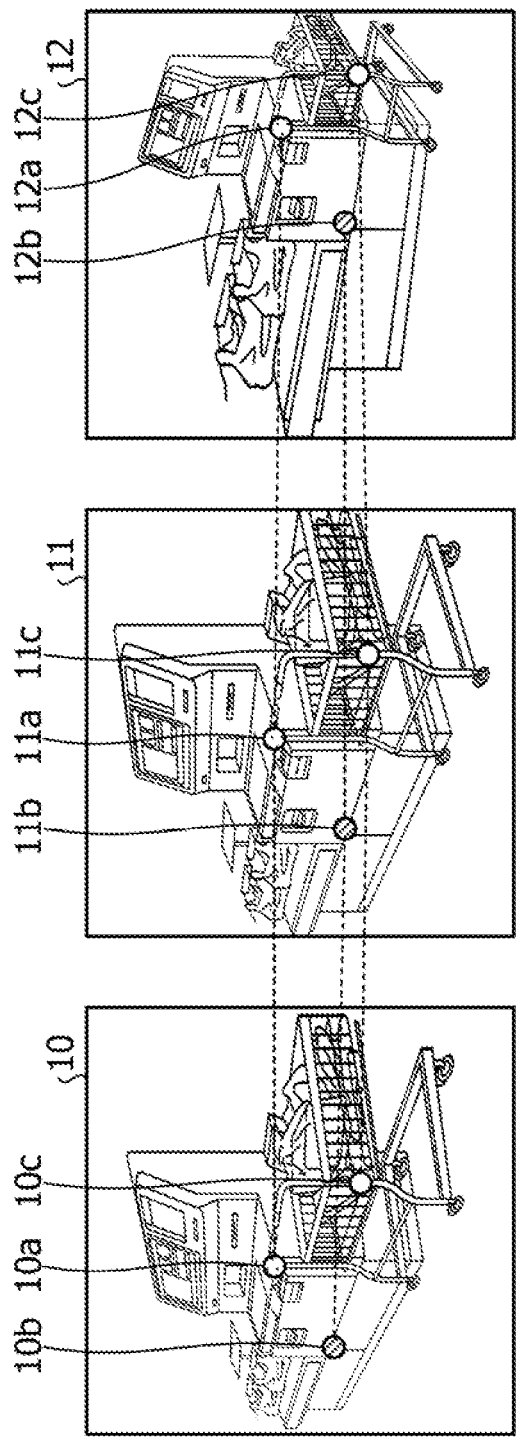
FIG. 29 is a diagram (1) for explaining the SfM.
Figure 30:
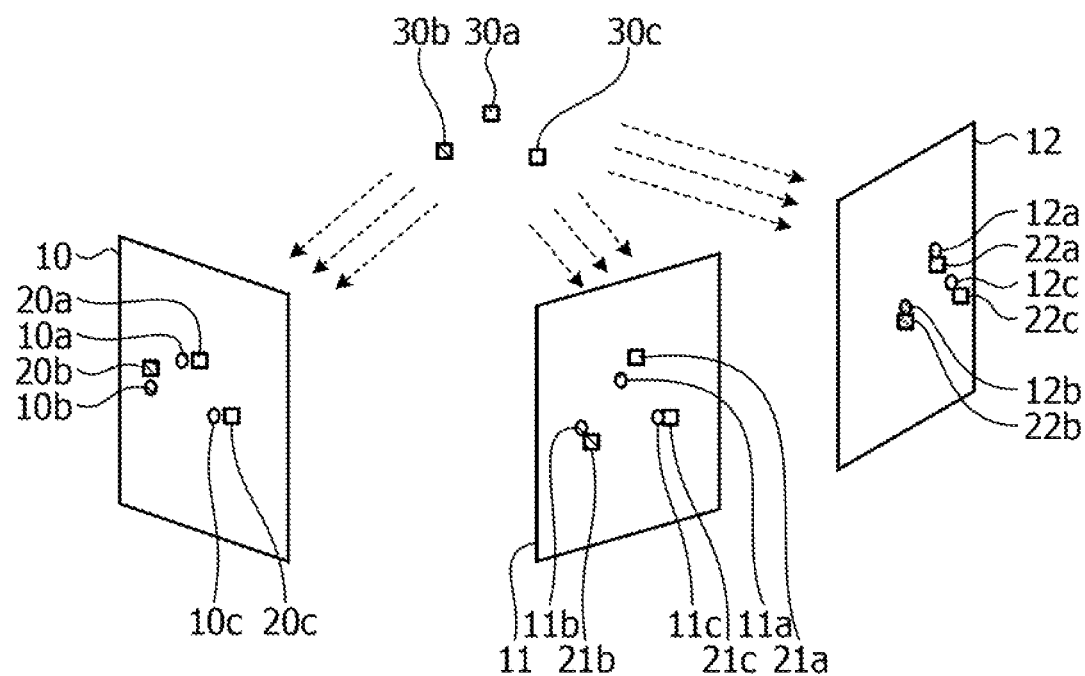
FIG. 30 is a diagram (2) for explaining the SfM.

An example of a hardware configuration of a computer that realizes functions same as the functions of the shape estimating apparatus 100 explained in the embodiment is explained. FIG. 28 is a diagram illustrating an example of a hardware configuration of a computer that realizes functions same as the functions of the shape estimating apparatus.

As illustrated in FIG. 28, the computer 200 includes a CPU 201 that executes various pieces of arithmetic processing, an input device 202 that receives input of data from a user, and a display 203. Examples of the data received by the input device 202 include multiple pieces of image information photographed by a camera. The computer 200 includes a reading device 204 that reads a computer program and the like from a storage medium and an interface device 205 that performs exchange of data with another computer via a network. The computer 200 includes a RAM 206 that temporarily stores various pieces of information and a hard disk device 207. The devices 201 to 207 are connected to a bus 208.

The hard disk device 207 includes a reception program 207a, an extraction program 207b, an estimation program 207c, and an integration program 207d. The CPU 201 reads out the reception program 207a, the extraction program 207b, the estimation program 207c, and the integration program 207d and develops the programs in the RAM 206.

The reception program 207a functions as a reception process 206a. The extraction program 207b functions as an extraction process 206b. The estimation program 207c functions as an estimation process 206c. The integration program 207d functions as an integration process 206d.

Processing by the reception process 206a corresponds to the processing by the receiving unit 131. Processing by the extraction process 206b corresponds to the processing by the extracting unit 132. Processing by the estimation process 206c corresponds to the processing by the estimating unit 133. Processing by the integration process 206d corresponds to the processing by the integrating unit 134.

Note that the programs 207a to 207d do not have to be stored in the hard disk device 207 from the beginning. For example, the programs 207a to 207d are stored in a "portable physical medium" such as a flexible disk (FD), a CD-ROM, a DVD disk, a magneto-optical disk, or an IC card inserted into the computer 200. The computer 200 may read out and execute the programs 207a to 207d.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for shape estimation, performed by a computer, the method comprising:
   executing extraction processing that includes extracting a plurality of feature points from a plurality of pieces of image information of a same subject photographed with a time difference;
   executing estimation processing that includes
      first processing for selecting first feature points from the plurality of feature points such that a component determined as a noise is removed from the selected first feature points,
      second processing for estimating a three-dimensional shape of the subject based on the selected first feature points after the first processing is performed,
      third processing for obtaining second feature points by removing the selected first feature points from the plurality of feature points after the estimation of the three-dimensional shape is performed by the second processing with the selected first feature points, and
      fourth processing for executing the first processing, the second processing, and the third processing on the second feature points as the plurality of feature points from which the feature points are removed by the third processing; and
   executing integration processing that includes integrating a plurality of the three-dimensional shapes estimated by the estimating processing,
   wherein the third processing is configured to
      divide a region including the selected first feature points into a plurality of partial regions when the estimation of the three-dimensional shape of the subject is performed successfully; and
      obtain the second feature points by removing, from the plurality of partial regions, a partial region where a ratio of included feature points other than the selected first feature points is smaller than a threshold.

2. The method according to claim 1,
   wherein the plurality of pieces of image information are pieces of image information respectively photographed by a same camera according to different parameters, and wherein the integration processing includes integrating the plurality of three-dimensional shapes after converting three-dimensional coordinates of the plurality of three-dimensional shapes according to a designated parameter.

3. An apparatus for shape estimation, the apparatus comprising:

a memory; and a processor coupled to the memory and configured to execute extraction processing that includes extracting a plurality of feature points from a plurality of pieces of image information of a same subject photographed with a time difference;

execute estimation processing that includes first processing for selecting first feature points from the plurality of feature points such that a component determined as a noise is removed from the selected first feature points, second processing for estimating a three-dimensional shape of the subject based on the selected first feature points after the first processing is performed, third processing for obtaining second feature points by removing the selected first feature points from the plurality of feature points after the estimation of the three-dimensional shape is performed by the second processing with the selected first feature points, and fourth processing for executing the first processing, the second processing, and the third processing on the second feature points as the plurality of feature points from which the feature points are removed by the third processing; and execute integration processing that includes integrating a plurality of the three-dimensional shapes estimated by the estimating processing, wherein the third processing is configured to divide a region including the selected first feature points into a plurality of partial regions when the estimation of the three-dimensional shape of the subject is performed successfully; and obtain the second feature points by removing, from the plurality of partial regions, a partial region where a ratio of included feature points other than the selected first feature points is smaller than a threshold.

4. The apparatus according to claim 3, wherein the plurality of pieces of image information are pieces of image information respectively photographed by a same camera according to different parameters, and wherein the integration processing includes integrating the plurality of three-dimensional shapes after converting three-dimensional coordinates of the plurality of three-dimensional shapes according to a designated parameter.

5. A non-transitory computer-readable storage medium for storing a program for shape estimation, the program causing a computer to execute a process, the process comprising:

executing extraction processing that includes extracting a plurality of feature points from a plurality of pieces of image information of a same subject photographed with a time difference;

executing estimation processing that includes first processing for selecting first feature points from the plurality of feature points such that a component determined as a noise is removed from the selected first feature points, second processing for estimating a three-dimensional shape of the subject based on the selected first feature points after the first processing is performed, third processing for obtaining second feature points by removing the selected first feature points from the plurality of feature points after the estimation of the three-dimensional shape is performed by the second processing with the selected first feature points, and fourth processing for executing the first processing, the second processing, and the third processing on the second feature points as the plurality of feature points from which the feature points are removed by the third processing; and executing integration processing that includes integrating a plurality of the three-dimensional shapes estimated by the estimating processing, wherein the third processing is configured to divide a region including the selected first feature points into a plurality of partial regions when the estimation of the three-dimensional shape of the subject is performed successfully; and obtain the second feature points by removing, from the plurality of partial regions, a partial region where a ratio of included feature points other than the selected first feature points is smaller than a threshold.

6. The non-transitory computer-readable storage medium according to claim 5, wherein the plurality of pieces of image information are pieces of image information respectively photographed by a same camera according to different parameters, and wherein the integration processing includes integrating the plurality of three-dimensional shapes after converting three-dimensional coordinates of the plurality of three-dimensional shapes according to a designated parameter.

* * * * *